(12) United States Patent
Saptharishi

(10) Patent No.: US 9,756,294 B2
(45) Date of Patent: *Sep. 5, 2017

(54) CONTENT-AWARE COMPUTER NETWORKING DEVICES WITH VIDEO ANALYTICS FOR REDUCING VIDEO STORAGE AND VIDEO COMMUNICATION BANDWIDTH REQUIREMENTS OF A VIDEO SURVEILLANCE NETWORK CAMERA SYSTEM

(71) Applicant: AVIGILON PATENT HOLDING 2 CORPORATION, Vancouver (CA)

(72) Inventor: Mahesh Saptharishi, Arlington, MA (US)

(73) Assignee: AVIGILON ANALYTICS CORPORATION, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/077,822

(22) Filed: Mar. 22, 2016

(65) Prior Publication Data

US 2016/0205422 A1 Jul. 14, 2016

Related U.S. Application Data

(63) Continuation of application No. 14/095,997, filed on Dec. 3, 2013, now Pat. No. 9,325,951, and a
(Continued)

(51) Int. Cl.
*H04N 7/18* (2006.01)
*H04N 21/2385* (2011.01)
(Continued)

(52) U.S. Cl.
CPC ......... *H04N 7/181* (2013.01); *G06F 17/3082* (2013.01); *G06F 17/30858* (2013.01);
(Continued)

(58) Field of Classification Search
CPC ...................................... H04N 7/181
See application file for complete search history.

(56) References Cited

U.S. PATENT DOCUMENTS 5,289,275 A 2/1994 Ishii et al.
6,259,690 B1 7/2001 Yoshizawa et al.
(Continued)

FOREIGN PATENT DOCUMENTS

CN 1729440 A 2/2006
CN 1753477 A 3/2006
(Continued)

OTHER PUBLICATIONS

Wei et al.; "Design and Implementation of an IP-Based Intelligent Video Surveillance System"; ICSP2006 IEEE Proceedings; 2006; 4 pages.
(Continued)

*Primary Examiner* — Nam Pham
(74) *Attorney, Agent, or Firm* — Baker & Hostetler LLP

(57) ABSTRACT

Disclosed are systems and methods for reducing video communication bandwidth requirements of a video surveillance network camera system that includes network communication paths between network video cameras producing video streams of scenes observed by the network video cameras and content-aware computer networking devices analyzing by video analytics video visual content of the video streams to provide managed video representing, at specified quality levels, samples of the scenes observed. Distribution of the managed video consumes substantially less network bandwidth than would be consumed by delivery through network communication paths a video stream at the specified quality level in the absence of analysis by the video analytics.

22 Claims, 12 Drawing Sheets

Related U.S. Application Data continuation-in-part of application No. 12/940,829, filed on Nov. 5, 2010, now abandoned, which is a continuation of application No. 12/105,871, filed on Apr. 18, 2008, now Pat. No. 8,872,940.

(60) Provisional application No. 61/033,290, filed on Mar. 3, 2008, provisional application No. 61/732,720, filed on Dec. 3, 2012.

(51) Int. Cl.
| | | |
|---|---|---|
| G06F 17/30 | (2006.01) | |
| G06K 9/00 | (2006.01) | |
| H04L 29/06 | (2006.01) | |
| H04N 21/4223 | (2011.01) | |
| H04N 21/647 | (2011.01) | |
| H04N 9/79 | (2006.01) | |
| H04N 5/765 | (2006.01) | |
| H04N 5/77 | (2006.01) | |
| H04N 9/804 | (2006.01) | |
| H04N 5/232 | (2006.01) | |
| G08B 13/196 | (2006.01) | |

(52) U.S. Cl.
CPC ...... *G06K 9/00711* (2013.01); *G06K 9/00771* (2013.01); *H04L 65/607* (2013.01); *H04N 5/765* (2013.01); *H04N 5/772* (2013.01); *H04N 9/7921* (2013.01); *H04N 9/8042* (2013.01); *H04N 21/2385* (2013.01); *H04N 21/4223* (2013.01); *H04N 21/64738* (2013.01); *H04N 21/64792* (2013.01); *G06K 2009/00738* (2013.01); *G08B 13/19656* (2013.01); *G08B 13/19667* (2013.01); *H04N 5/23203* (2013.01)

(56) References Cited

U.S. PATENT DOCUMENTS

| | | | |
|---|---|---|---|
| 6,654,373 | B1 | 11/2003 | Maher, III et al. |
| 6,833,865 | B1 | 12/2004 | Fuller et al. |
| 7,002,478 | B2 | 2/2006 | Moore et al. |
| 7,339,937 | B2 | 3/2008 | Mitra et al. |
| 7,477,285 | B1 | 1/2009 | Johnson |
| 2001/0021942 | A1 | 9/2001 | De Bot et al. |
| 2002/0045961 | A1 | 4/2002 | Gibbs et al. |
| 2002/0122659 | A1 | 9/2002 | McGrath et al. |
| 2003/0044168 | A1 | 3/2003 | Matsukawa |
| 2003/0193571 | A1 | 10/2003 | Schultz et al. |
| 2004/0080615 | A1 | 4/2004 | Klein et al. |
| 2004/0080618 | A1 | 4/2004 | Norris et al. |
| 2004/0086091 | A1 | 5/2004 | Naidoo et al. |
| 2004/0105450 | A1 | 6/2004 | Ikuta et al. |
| 2004/0126038 | A1 | 7/2004 | Aublant et al. |
| 2004/0131231 | A1 | 7/2004 | Smilansky |
| 2004/0240546 | A1 | 12/2004 | Wells |
| 2005/0010797 | A1 | 1/2005 | Rushworth |
| 2005/0068429 | A1 | 3/2005 | Kreiner et al. |
| 2005/0169367 | A1* | 8/2005 | Venetianer ........ G06F 17/30799 375/240.01 |
| 2005/0177652 | A1 | 8/2005 | Cumpson et al. |
| 2005/0185526 | A1 | 8/2005 | Altare |
| 2005/0271251 | A1 | 12/2005 | Russell et al. |
| 2006/0053459 | A1 | 3/2006 | Simerly et al. |
| 2006/0077256 | A1 | 4/2006 | Silvemail et al. |
| 2006/0078047 | A1 | 4/2006 | Shu et al. |
| 2006/0140095 | A1 | 6/2006 | Kazami et al. |
| 2006/0143420 | A1 | 6/2006 | Van Gassel et al. |
| 2006/0165386 | A1 | 7/2006 | Garoutte |
| 2006/0215904 | A1 | 9/2006 | Ibrahim et al. |
| 2006/0224875 | A1 | 10/2006 | Choi et al. |
| 2006/0227995 | A1 | 10/2006 | Spatharis |
| 2007/0039030 | A1 | 2/2007 | Romanowich et al. |
| 2007/0130600 | A1 | 6/2007 | Yanai |
| 2007/0185989 | A1 | 8/2007 | Corbett et al. |
| 2007/0204124 | A1 | 8/2007 | Van Gassel et al. |
| 2007/0217761 | A1 | 9/2007 | Chen et al. |
| 2007/0217765 | A1 | 9/2007 | Itoh et al. |
| 2007/0257985 | A1 | 11/2007 | Estevez et al. |
| 2007/0296817 | A1 | 12/2007 | Ebrahimi et al. |
| 2008/0036860 | A1 | 2/2008 | Addy |
| 2008/0080843 | A1 | 4/2008 | Hibbard et al. |
| 2008/0084473 | A1 | 4/2008 | Romanowich |
| 2008/0088627 | A1 | 4/2008 | Shimizu et al. |
| 2008/0129844 | A1 | 6/2008 | Cusack et al. |
| 2008/0136934 | A1 | 6/2008 | Zhao et al. |
| 2008/0259160 | A1 | 10/2008 | Morimitsu et al. |
| 2008/0297599 | A1 | 12/2008 | Donovan et al. |
| 2009/0085740 | A1 | 4/2009 | Klein et al. |
| 2009/0135007 | A1 | 5/2009 | Donovan et al. |
| 2009/0141939 | A1 | 6/2009 | Chambers et al. |
| 2009/0141940 | A1 | 6/2009 | Zhao et al. |
| 2009/0163079 | A1 | 6/2009 | Nguyen |
| 2009/0170558 | A1 | 7/2009 | Kuo |
| 2010/0034420 | A1 | 2/2010 | Xiong et al. |

FOREIGN PATENT DOCUMENTS

| | | |
|---|---|---|
| CN | 1996266 A | 7/2007 |
| WO | WO 2004/057455 A2 | 7/2004 |
| WO | WO 2005/004062 A2 | 1/2005 |

OTHER PUBLICATIONS

Andrew T. Campbell et al., 'Open Signaling for ATM, Internet and Mobile Networks (OPENSIG'98)', University ofToronto, Ontario, Oct. 5-6, 1998.

A. Carzaniga et al., 'Content-Based Addressing and Routing: A General Model and its Application,' University of Colorado, Jan. 2000.

M. Scholler et al., 'An Extension to Packet Filtering of Programmable Networks,' Proc. of 7th Annual Int. Working Cont. on Active Networking (IWAN) 2005.

V. Jacobson et al., 'Networking Named Content,' Palo Alto Research Center, Palo Alto, CA, Dec. 1-4, 2009.

L. Peterson et al., 'An OS Interface for Active Routers,' Technical Report, Active Networks NodeOS Working Group, Feb. 2, 1999.

S. Thibault et al., 'Adapting Distributed Applications Using Extensible Networks,' INRIA, Sep. 1998, No. 3484, pp. 1-22.

C. P. Hall, 'DV/DRP: A Content-Based Networking Protocol for Sensor Networks,' Techical Report Apr. 2006, Faculty of Informatics, U. of Lugano, Sep. 2006.

Taneja Group Technology Analysis, Five Criteria for Video Surveillance Storage, Jun. 2007, 8 pp.

IoImage, ioicam wdc 100dn Ultra-Wide-Dynamic-Range Color Day/Night Intelligent-Video IP Camera, no date, 6 pp.

Luminera, Li045 Intelligent Network Camera with Ultra-Wide Dynamic Range, Sep. 2007, 2 pp.

Panasonic, Network Security Color Camera WV-NP244, no date, 2 pp.

IoImage, VTD White Paper, 2005, 20 pp.

Peng, Video Analytics: Content analysis in security surveillance applications, available at http://www.videsignline.com/showArticle.jhtml?printable Article=true&articleId=202102695, Sep. 27, 2007, visited Oct. 8, 2007, 4 pg.

Storage on Board Surveillance, *IP Video Security Magazine*, Oct. 2007, 5 pp.

Kozierak, M., Start/Stop Cycles, *The PC Guide*, available at http://www.pcguide.com/ref/hdd/perf/qual/specCycles-c.html, Apr. 2001, visited Mar. 19, 2009, 2 pp.

Kozierak, Cache Size, the PC Guide, available at http://www.pcguide.com/ref/hdd/oplcacheSize-c.html, Apr. 2001, visited Mar. 19, 2009, 2 pp.

Andrew T. Campbell et al., "A Survey of Programmable Networks", Computer Communication Review, vol. 29 Issue 2, Apr. 1999, pp. 7-23.

"Mass Storage", entry from Wikipedia.org, retrieved Jul. 31, 2012.

(56) References Cited

OTHER PUBLICATIONS

"Mass Storage", entry from Webopedia.com, retrieved Jul. 31, 2012.
"Mass Storage", definition from PCMag.com, retrieved Jul. 31, 2012.
Parker, "McGraw-Hill Dictionary of Scientific and Technical Terms," 5.sup.th Edition, 1994, McGraw-Hill, p. 2133.
Seagate, datasheet, LD25.2 series, May 2007, 2 pp.
Heybruck, Enhanced Adaptive Battery Life Extender, Hitachi, Dec. 2004, 3 pp.
Kim et al., Ramp Load/Unload Technology in Hard Disk Drives, Hitachi, Jan. 2005, 5 pp.
Hitachi, Hitachi Travelstar.RTM. 4K120, Jun. 2005, 2 pp.
Hitachi, Hitachi Travelstar.RTM. 5K250, Aug. 2007, 2 pp.
Hie Electronics, Hie Electronics Disruptive Technology and Long-Term Deep Image/Data Storage: 100 and 500 Camera 1-Year Archive Case Studies: A New Perspective on Total Cost of Ownership (TCO), Jul. 28, 2007, 22 pp.
Bit Micro Networks, Flash Solid State Disk-Write Endurance in Database Environments, available at http://www.bitmicro.com/press.sub.--resources.sub.--flash.sub.--ssd.sub.-- - db.sub.--prt.php, Mar. 4, 2005, visited Mar. 19, 2009, 10 pp.
Schroeder et al., Disk Failures in the Real World: What Does an MTTF of 1,000,000 Hours Mean to You?, 5th USEAUX Conference on File and Storage Technologies, available at http://www.usenix.org/events/fast07/tech/schroeder/schroeder.sub.--html/i-ndex.html, Feb. 2007, visited Mar. 19, 2009, 23 pp.
International Search Report, PCT/US2009/035666, Jun. 29, 2009.

\* cited by examiner

CONTENT-AWARE COMPUTER NETWORKING DEVICES WITH VIDEO ANALYTICS FOR REDUCING VIDEO STORAGE AND VIDEO COMMUNICATION BANDWIDTH REQUIREMENTS OF A VIDEO SURVEILLANCE NETWORK CAMERA SYSTEM

CROSS REFERENCE TO RELATED APPLICATIONS

This application is a continuation of U.S. patent application Ser. No. 14/095,997, filed Dec. 3, 2013, which claims priority benefit of U.S. Provisional Application No. 61/732,720, filed Dec. 3, 2012, and is a continuation-in-part of U.S. patent application Ser. No. 12/940,829, filed Nov. 5, 2010, which is a continuation of U.S. patent application Ser. No. 12/105,871, filed Apr. 18, 2008, now U.S. Pat. No. 8,872,940, issued Oct. 28, 2014, which claims priority benefit of U.S. Provisional Application No. 61/033,290, filed Mar. 3, 2008.

TECHNICAL FIELD

This disclosure describes a video imaging system that intelligently recognizes the content of video data, reduces system storage and bandwidth capacity demands, and prolongs the operational lifespan of video data mass storage units.

BACKGROUND INFORMATION

Network camera systems, for example video surveillance network camera systems and IP camera systems, have existed for a number of years but have undergone relatively slow industry adoption. Compared to traditional analog camera systems, network camera systems offer advantages such as accessibility, integration, low installation costs, scalability, and an ability to move to higher resolution video. Video visual content and data produced by network cameras, however, demand large amounts of bandwidth and storage capacity.

Bandwidth problems associated with network camera systems have led to more complex camera networks that include an increased number of switches and, in some cases, complete alternative data paths. Storage problems associated with network camera systems become magnified as video resolution and the number of cameras in a system increase. For example, a single standard 01 resolution camera using MPEG-4 compression and operating at 30 frames-per-second (fps) can require 360 gigabytes (GB) of storage for video data representing one month of video data. A camera system with 1000 cameras, therefore, would require 360 terabytes (TB) of storage for data spanning one month. This example demonstrates a huge cost and facility management challenge presented with network camera systems, especially where mega-pixel resolution is desired and where applications require six months or a year of video data storage. Due to the problems identified, most network video data are not recorded at full quality, but are recorded at lower resolutions and frame rates. Because typical high resolution cameras generate video data requiring a large amount of storage resources within a short period of time, it is impractical for a typical camera to include a self-contained storage unit, such as a hard drive, that is able to store a significant amount of video data.

Typical storage architecture of network camera systems is configured with central storage similarly to traditional analog systems. The architecture includes centrally located digital video recorders (DVRs) or network video recorders (NVRs) connected through a network to IP cameras. The typical architecture for IP cameras is inadequate for a number of reasons. If, for example, the network fails or is made nonoperational for maintenance or any other reason, all video is lost and can never be retrieved. Numerous (e.g., many dozens of) cameras streaming across the network to a central storage device place severe bandwidth demands on the network. Moreover, 99% of the bandwidth used is wasted because typically less than 1% of the video is ever accessed for review. Additionally, typical network camera systems often lack storage scalability such that, as network camera systems expand, central storage systems require "forklift" upgrades.

Another problem with typical video data storage configurations is that many applications require storage devices to continuously run. Such continuous operation causes the storage devices to fail after three to five years of operation. Unless archived or stored redundantly, data on failed storage devices become lost. The need to replace storage devices, therefore, becomes a significant concern and maintenance issue.

Recently, some network camera systems have implemented video analytics processing to identify when important events (such as object movement) are being captured by a video camera. Video analytics has been primarily used to alert security of potential unwanted events. Most video analytics is performed by a central processor that is common to multiple cameras, but some video cameras have built-in video analytics capabilities. These video cameras with built-in analytics, however, have not included large capacity storage due to the large storage requirements of the video data generated by the camera and the traditional approach of centralized storage. Also, there are some cameras configured without built-in video analytics but with built-in small storage capacity that is insufficient to serve as a substitute for traditional DVRs and NVRs. Moreover, if the video data are stored only in the camera, the stored video data are vulnerable to attack or being stolen.

Computer networking devices, such as switches and routers, are at the heart of any network infrastructure and are central to a network's quality of service (QoS). QoS in a network is assessed by a combination of the following metrics: (1) speed—information should be delivered at the fastest possible speed from the source to its destination (sink); (2) scalability—as more nodes (sources, sinks, switches and routers) are added, the network should scale seamlessly and automatically adapt to increased loads, increased resources and increased network routing options; (3) redundancy and fault-tolerance—if nodes in the network fail, systems should still be able to function normally. Additionally, redundancy in the network should improve data access times during periods of heavy loads.

Packet switching and routing have traditionally been non-discriminatory, content-agnostic processes in networks. But as high-speed data links facilitate sophisticated and network-intensive applications, switches and routers are becoming increasingly content aware. For example, some recent routers analyze data packet contents for the existence of computer viruses and worms, and monitor application specific traffic patterns for denial of service attacks. Thus, rudimentary content-awareness has been known to improve network security.

Content-awareness can also promote quality of service in a network. For example, some specialized routers are optimized for video streaming. Such routers are designed to handle multicasting and unicasting from a small set of servers to a large number of clients. These routers are also capable of transcoding video streams depending on the content and the capabilities of the client. The specialized routers treat video and audio differently from other packets of information by categorizing data packets as either non-time-critical data or real-time video and audio.

Therefore, a need exists for a network camera system that produces high quality video data, requires less storage capacity and network bandwidth, meets IT standards, is easily scalable, and operates for a longer period of time without storage device replacement.

SUMMARY OF THE DISCLOSURE

The disclosed embodiments implement methods and systems of content-aware storage of video data produced by a video camera, which includes a camera housing and is adapted for connection to a network communication system. The video data produced represent a field of view of a scene observed by the video camera. Video analytics and a mass storage unit are contained in or form part of the camera housing. The video analytics analyzes the video data produced by the video camera and detects whether there is an occurrence of an event of interest. The video data representing the field of view of the scene observed by the video camera are stored in the mass storage unit. The stored video data include video data of a first quality and video data of a second quality. The first quality represents the occurrence in the field of view of the event of interest detected by the video analytics, and the second quality represents nonoccurrence in the field of view of the event of interest detected by the video analytics. By storing video data in the mass storage unit contained in or forming part of the camera housing, the majority of network bandwidth requirements are eliminated because the video data need not be streamed across the network for storage purposes.

The implementation described above reduces video data storage and network bandwidth requirements of a distributed network video surveillance system that includes network communication paths between network video imaging devices and network video data stores. In such surveillance system, the network video imaging devices produce video data representing fields of view of scenes under observation by the video imaging devices, and the network video data stores store video information corresponding to the video data produced by the network video imaging devices. Each of multiple ones of the network video imaging devices is associated with a content-aware video data storage system that is capable of selective storage of video data produced by its associated network video imaging device. The content-aware video data storage system includes video analytics that analyzes the content of the video data and local video data stores that store portions of the video data in response to the analysis by the video analytics. Video data corresponding to the portions of video data are delivered through the network communication paths to the network video data stores to provide a managed amount of video data representing at a specified quality level the fields of view of the scenes. The managed amount of the video data consumes substantially less network bandwidth and fewer data storage resources than those which would be consumed by delivery to the network video stores the video data produced by the network video imaging devices at the specified quality level and in the absence of analysis by the video analytics. While video surveillance applications are of particular interest, the above approach is applicable across a wide variety of video applications.

Routers and switches have evolved considerably in the past decade. At the same time, DVRs and NVRs for security applications have also become increasingly sophisticated. This disclosure describes embodiments that bridge the gap between traditional routers designed for generic IP networks and DVRs and NVRs that form the backbone of most modern digital surveillance systems.

Disclosed methods and apparatuses for scaleable data routing and packaging controlled by real-time content analysis and valuation for security and surveillance sensor (for e.g., video camera) networks include the following example features.

A real-time analytics service converts raw sensor information to symbolic metadata (for e.g., a textual script). In a video sensor, the analytics services include any of the following: motion detection, intrusion detection, object recognition, face recognition, license plate recognition, object tracking, behavior recognition, or three-dimensional structure inference (including object distance, size, speed, or other inferences).

A real-time sensor data packaging (encoding/transcoding) service assesses information value in the compression and packaging process. If sensor information is being stored and/or forwarded, it is packaged based on the capabilities of the recipient(s) of the data and the associated value of the data. The packaging process encapsulates any appropriate combination of the following: (1) summary of the data, including, for example, a textual script of the content of a sensor's data stream (i.e., metadata); (2) binary chunks representing valuable pieces of information in raw or processed forms, for example, all faces detected in a video stream may be transmitted for further processing; (3) a content-aware transcoded stream-sensor data that is compressed based on the value of the video visual content of the data. The quality control parameters of the codec in use are adjusted such that valuable data is encoded at a higher quality level than less valuable data. Certain frames in a video stream might be encoded at lower quality levels. Similarly certain parts of a frame might be encoded at a higher quality level. For example, the parts of a frame of video that contain license plates of vehicles might be encoded at the highest quality level, while the parts that contain the sky and foliage might be encoded at a low quality level.

Content-aware computer networking devices receive user specified event values based on rule-action pairs. Rules are a composition of descriptors extracted from raw sensor data using various analytics services. For example, the user might be interested in only red trucks with license plate number ABC 123 (e.g., the specified rule) and the user might want this event to be recorded and a guard notified (e.g., the specified action) while other events are ignored. In some embodiments, a service deployment strategy is computed based on the rule-action pairs specified by the user and the services offered by each node in the network. Some embodiments include a local, value-and-priority assessment mechanism based on the user specified rule-action pair. When a sequence of descriptors is extracted from the sensor data, the user-specified rules are used to assign value to the associated packets of sensor data.

In some embodiments, a local routing table is generated based on extracted metadata, information value, and service topology. Routing decisions are then made according to one of several options, including: (1) Discard: If there is no value associated with a sensor's data packet, it is discarded. Unlike protocols such as UDP wherein packets are discarded as an indirect consequence of a best-effort transmission scheme, this disclosure describes embodiments that discard packets based on its assessed value. (2) Store: If there is some value associated with a sensor's data packet, but there is no urgency in delivery, the packet can be stored locally until it is transmitted. Content-aware computer networking devices include local mass storage media for long-term storage of information. (3) Forward: If the packet is valuable, then it is forwarded either to another network attached node for further processing, or to a pre-designated destination for user-specified action. High value packets might also be stored locally in addition to being forwarded.

According to some embodiments, a protocol allows for a network of sensors, switches, and routers to discover one another and services (e.g., video analytics) each of the devices offer. Some embodiments include a network condition monitoring service to dynamically respond to failures or changes in the network topology.

Additional aspects and advantages will be apparent from the following detailed description of preferred embodiments, which proceeds with reference to the accompanying drawings.

DETAILED DESCRIPTION OF EMBODIMENTS

Figure 1:
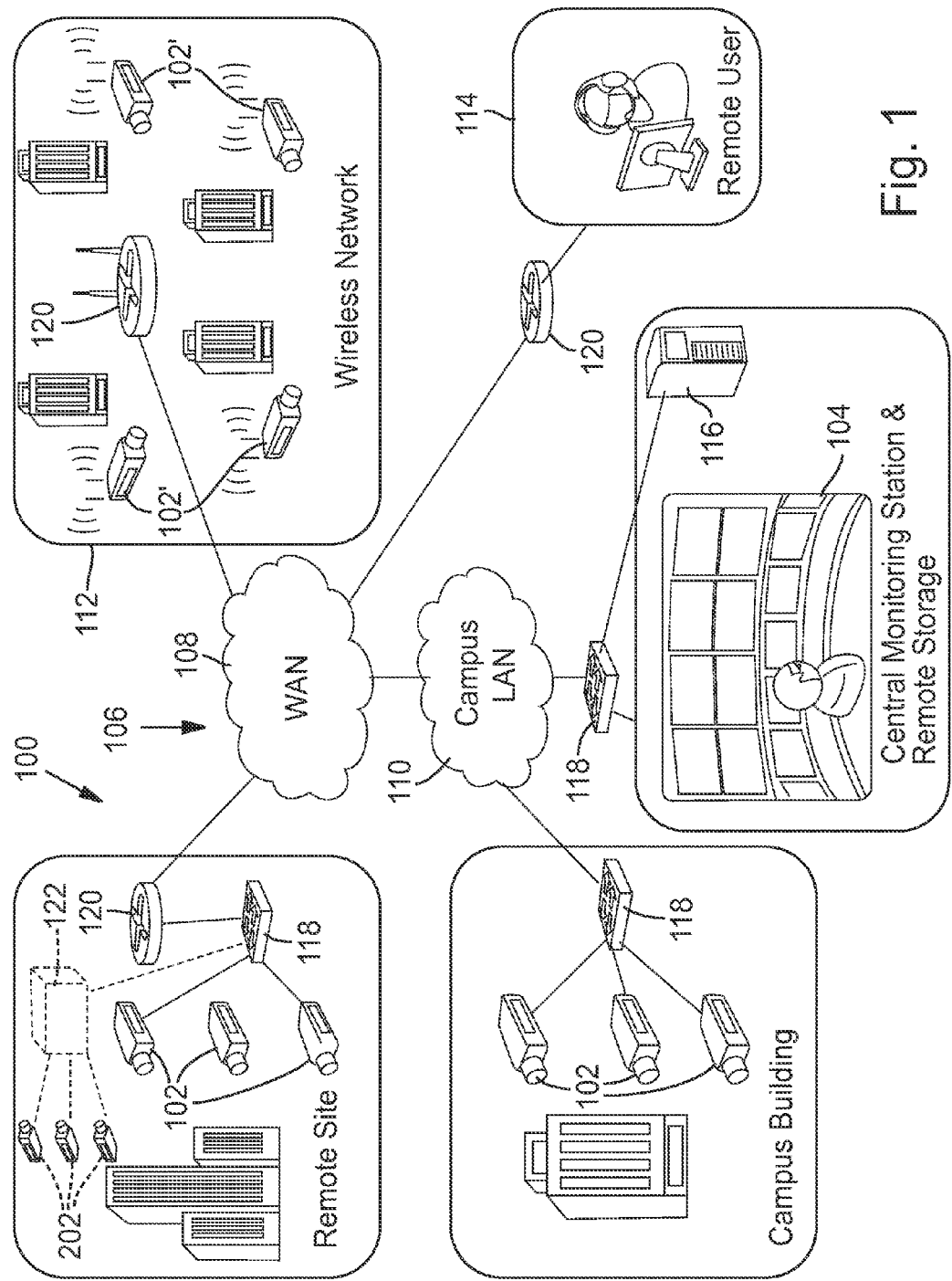
FIG. 1 is a pictorial diagram depicting an embodiment of a network camera system.

System components with like reference numerals perform the same functions in each of the embodiments of a content-aware storage system described below.

FIG. 1 is a pictorial diagram depicting an embodiment of a network camera system 100 utilized in an application with local campus buildings and remote sites. Network camera system 100 is not limited to video surveillance or to the application depicted, but may be used in any network communication system. Network camera system 100 includes network cameras 102 connected to a central monitoring station 104 through a network 106 that includes a wide area network (WAN) 108 and a campus local area network (LAN) 110. Network 106 may also include a wireless network 112 that includes network cameras 102' with wireless communication capabilities. Network 106 establishes multiple network communications paths. The following descriptions of network camera 102 apply also to network camera 102'. Network 106 is not limited to the configuration depicted, but may include various configurations and types of networks. A remote user 114 may also be connected to network cameras 102 through WAN 108. Network cameras 102 may be connected to a remote storage unit 116 (i.e., a network data store). Network camera system 100 may also include various switches 118 and routers 120 to facilitate communication over network 106.

In operation, network cameras 102 capture various fields of view and generate data representing the fields of view. Certain applications may require substantially continuous operation of network camera 102. The data are communicated to central monitoring station 104, in which a user may view images, generated from the data, depicting the fields of view. Also, the data may be communicated to remote user 114 to generate images of the fields of view. The data may be stored in remote storage unit 116 and later accessed by a user.

Figure 2:
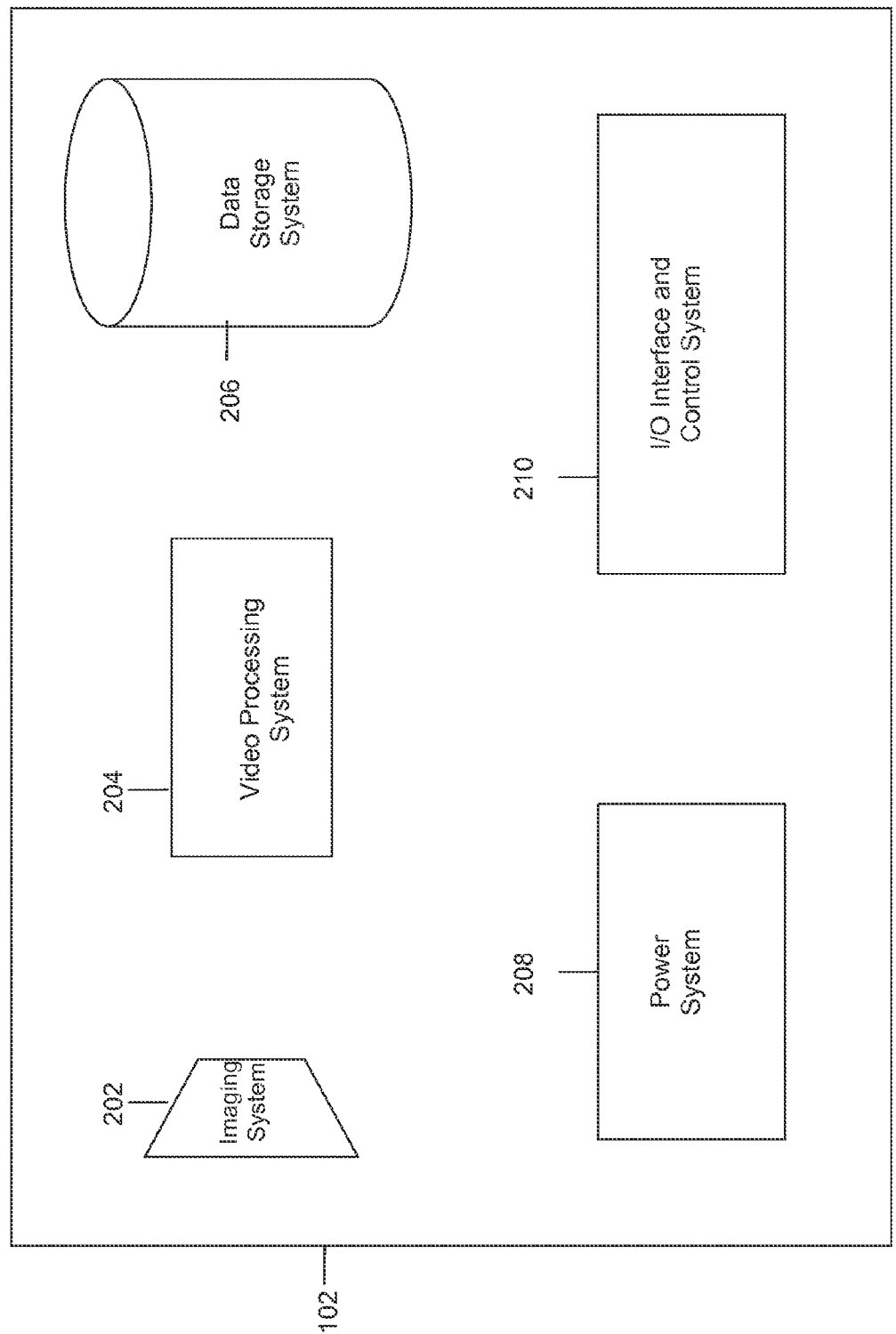
FIG. 2 is a high-level block diagram of a network camera of FIG. 1.

Network camera 102 will now be described in more detail with reference to FIG. 2. Network camera 102 includes an imaging system 202, a video processing system 204, a data storage system 206 (i.e., a local data store), a power system 208, and an input/output interface and control system 210. Network camera 102 includes a camera housing; and all or portions of systems 202, 204, 206, 208, and 210 may be contained within the housing. Imaging system 202 may include a wide variety of units for capturing a field of view and for generating video information including digital data and analog signals. For example, imaging system 202 may generate information according to NTSC/PAL formats and mega-pixel formats. Imaging system 202 may include programmable imagers, high-definition imagers, no/low light sensors, and specialized imagers that are more sensitive to certain spectrums of light. Imaging system 202 may include a scalable video codec, such as MPEG-4 SVC, and other video compression capabilities, such as H.264 compression. Power system 208 may include any system for receiving and distributing electrical power to various systems of network camera 102. Power may be DC power, including Power over Ethernet (PoE), or AC power. Input/output interface and control system 210 includes various hardware and software configurations to facilitate numerous types of communication including Internet; Ethernet; universal serial bus (USB); wireless; asynchronous transfer mode (ATM); Packet over SONET/SDH (POS); pan, zoom, tilt (PZT); and audio information. Input/output interface and control system 210 may be implemented in hardware and software to allow a user to configure operation of network camera 102.

Content-Aware Storage

This section includes descriptions of three embodiments. For clarity, video analytics and content-aware storage are described in detail with reference to a first and a second embodiment of network camera 102. Video analytics and content-aware storage concepts described in these two embodiments, however, are also applicable to a third embodiment in which multiple imaging systems 202 are connected to switches 118 and routers 120, through video server 122. Thus, although video analysis and other video processing described in the first two embodiments are performed by video processing system 204 of network camera 102, video data may also be supplied from network camera 102 to a network-connected video processor available in a video server 122, switches 118, or routers 120, to perform all or part of the video analysis and other video processing described in the following paragraphs. For example, as depicted by dashed lines in FIG. 1, in some embodiments, a video server 122 may be used in place of network camera 102, and multiple imaging systems 202 capturing different fields of view are connected to video server 122. Video server 122 therefore includes, within a server housing, video processing system 204, data storage system 206, power system 208, and input/output interface and control system 210. Thus, skilled persons should understand that video analysis and processing described in the following first and second embodiments may also be distributed throughout network camera system 100, as set forth in the third embodiment.

First Embodiment of Content-Aware Storage

Figure 3:
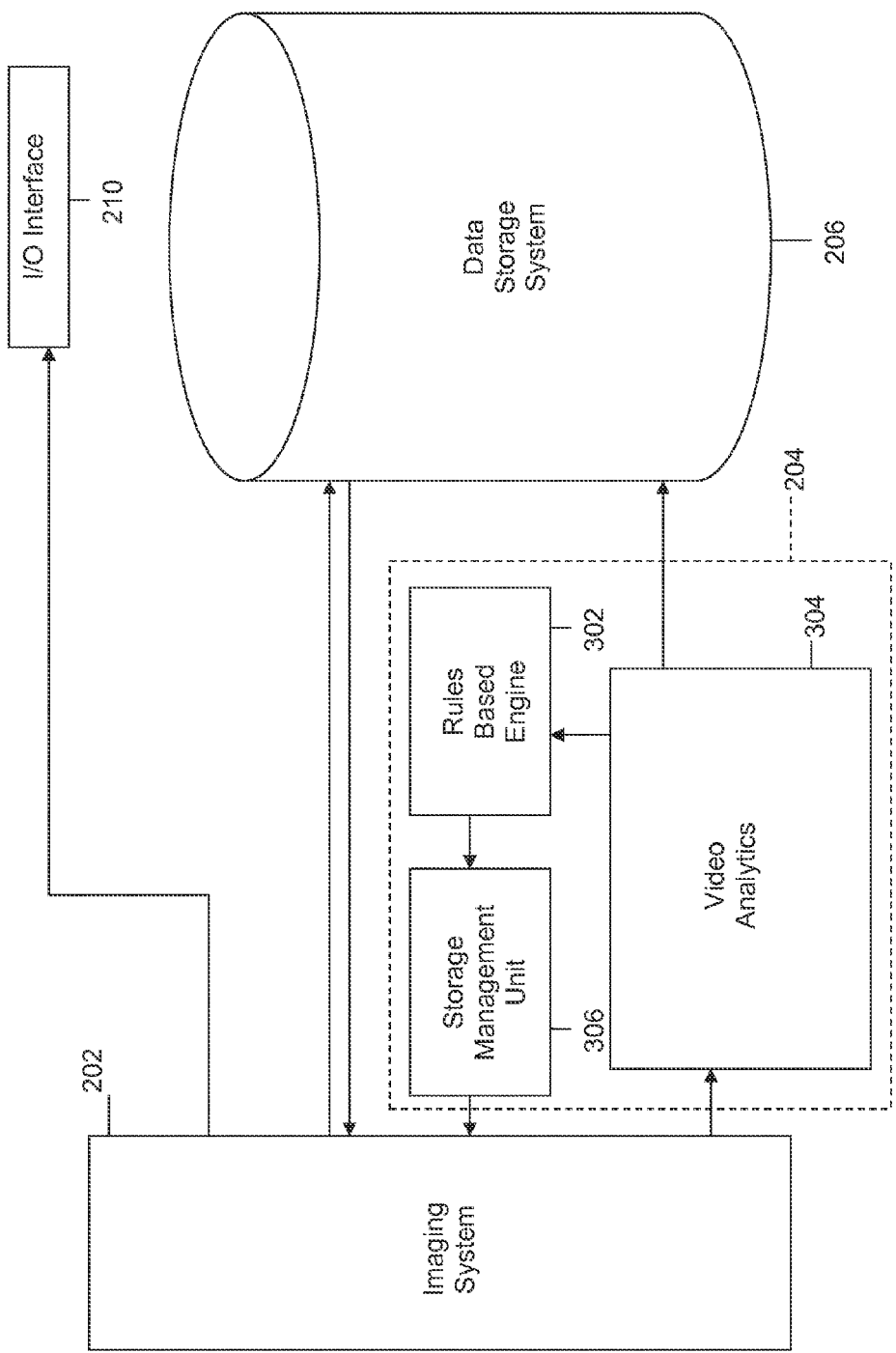
FIG. 3 is a block diagram depicting the imaging system, video processing system, and data storage system of FIG. 2 according to a first embodiment.

A first embodiment of network camera 102 is described in more detail with reference to FIG. 3. Video processing system 204 includes a rules based engine 302, video analytics 304, and a storage management system 306, some or all of which may be implemented in software. Video analytics 304 includes video analytics software operating in a video analytics processor.

Figure 8:
FIG. 8 is an image of a bird perched on a birdfeeder, in which image the bird and birdfeeder are displayed as high quality images and a background scene is displayed in low quality.

Video processing system 204 may also include video encryption capabilities to prevent unauthorized viewing of video information. Imaging system 202 captures a field of view and generates video data representing the field of view. Imaging system 202 may be programmable and may be capable of producing multiple quality levels of video data, including higher quality (HiQ) video data and lower quality (LowQ) video data. A quality level refers to multiple video parameters including resolution, frame rate, bit rate, and compression quality. For example, HiQ video data may represent 01 resolution video recorded at 30 frames-per-second (fps) and LowQ video data may represent CIF resolution video recorded at 5 fps. HiQ and LowQ video data are not limited to the parameters above. HiQ video data may represent 01 resolution video recorded at a lower frame rate—for example, 15 fps. In general, HiQ video data are video data that represent higher quality video than LowQ video data. HiQ video data are characterized by large storage requirements, and LowQ video data are characterized by small storage requirements. Imaging system 202 may produce more than two quality levels of video data. Imaging system 202 may be capable of producing different quality levels for different portions of a field of view within a video frame. For example, imaging system 202 may generate HiQ quality video data representing a person in the field of view while simultaneously generating LowQ video data representing background scene images of the field of view. As a further example, FIG. 8 depicts a bird perched on a bird-feeder in high resolution while the background scene is represented in low resolution.

Imaging system 202 communicates video data to video analytics 304. Video analytics 304, via the video analytics engine, analyzes the video data produced by imaging system 202 to detect whether a predefined event or object of interest is being captured by imaging system 202. The video data analyzed by video analytics 304 is preferably HiQ video data. Video analytics 304 generates metadata that describe the content of video data. The metadata produced by video analytics 304 may be a textual and semantic description of the content of the video.

Events and objects of interest may be programmed by a user and specified in an XML definitions file. The definitions file and video analytics 304 may be updated periodically, and definition files may be shared between video analytics 304 of different network cameras 102 within network camera system 100. Video analytics 304 of different network cameras 102 may have different analytic capabilities. Multiple events of interest may be defined, and more than one event of interest may occur at a particular time. Also, the nonoccurrence of one event leaves open the possibility of the occurrence of a second event. The metadata may be supplied to data storage system 206 and remote storage unit 116 for storage. The metadata representing an arbitrary frame n can be associated with video data representing frame n. Thus, the metadata may be searchable to allow a user to efficiently search and semantically browse large video archives, whether stored locally or remotely.

An event of interest that video analytics 304 detects may be as simple as motion in the field of view. Video analytics 304 may also implement blob detection (e.g. detecting a group of moving pixels as a potential moving object, without identifying what type of object it is), lighting change adjustment, and geometric calibration based on object size in the field of view to distinguish objects based on types. For example, video analytics 304 may be able to classify an object as a human being, a vehicle, or another type of object and be able to recognize an object when the object appears in any portion within the field of view of network camera 102. Furthermore, video analytics 304 may be able to recognize certain identifiable features of an object such as, for example, human faces and vehicle license plates. Video analytics 304 may be able to recognize when imaging system 202 is capturing a new object and assign a unique object ID to the new object. Video analytics 304 may be able to recognize the speed and trajectory at which an object moves. Video analytics 304 may be able to recognize events such as perimeter intrusion, object movement in a particular direction, objects approaching one another, a number of objects located in a specified area, objects left behind, and object removal. Video analytics 304 can also recognize specific locations, or coordinates, within the field of view where an event or object of interest is being captured, or a combination of objects and events, as defined by a rule.

When video analytics 304 detects an event or object of interest within the video data, video analytics 304 generates metadata that correspond to the event or object of interest and supplies the metadata to rules based engine 302. Rules based engine 302 includes rules that associate events or objects of interest, specified in the metadata, to specific actions to be taken. The actions associated with the rules may be to perform, for example, one or more of the following: store HiQ or LowQ video data in data storage system 206, store HiQ or LowQ video data in remote storage unit 116, stream HiQ or LowQ video data to central monitoring station 104 or remote user 114, generate and send a short video clip file of the event of interest to central monitoring station 104 or remote user 114, send an alert (e.g., instructions to generate one or both of a visual display and an audible sound) to central monitoring station 104 or remote user 114, store video data in data storage system 206 for X period of time. For example, a user may define the following rule: when a human being enters a defined perimeter, store in data storage system 206 HiQ video data representing the intrusion, alert central monitoring station 104 of the intrusion, generate a short video clip of the intrusion and send the video clip to central monitoring station 104, and store in remote storage unit 116 HiQ video data representing the intrusion. Or, a user may define the following rule: when no event or object of interest is being captured, store in data storage system 206 LowQ video data and send no video data to central monitoring station 104. Because video analytics 304 can detect various objects and events, a wide variety of rules may be defined by a user and each rule can have different storage quality settings. Also, because multiple events of interest may occur simultaneously, a rule may correspond to a combination of events.

Storage management system 306 may control storage of video data in data storage system 206 and in remote storage unit 116. Storage management system 306 is intelligently driven by the metadata generated in video analytics 304 and the rules defined in rules based engine 302. Storage management system 306 implements the actions defined by the rules. For example, storage management system 306 communicates to imaging system 202 to generate HiQ and/or LowQ video data to be stored in data storage system 206 and remote storage unit 116. Because video analytics 304 can specify locations, or coordinates, within the field of view where an event or object of interest is being captured, storage management system 306 can communicate to imaging system 202 which portions of the field of view are to be represented with HiQ video data (portions corresponding to events or objects) and LowQ video data (remaining portions). For example, FIG. 8 depicts a scene of a bird perched on a birdfeeder. Video analytics 304 can recognize the bird and portions of the birdfeeder as the most important features of the image or as objects of interest. The bird and birdfeeder, as the objects of interest, are displayed as HiQ images, while the background scene is displayed as a LowQ image. Also, imaging system 202 may be controlled such that a "windowed view" of the event or object of interest is generated by creating video data in which only the portion of the field of view corresponding to the event or object is displayed. Because HiQ and LowQ video data may be intelligently generated based upon content, events or objects of interest may be captured and stored as HiQ video data while overall storage requirements are lowered by generating LowQ video data to represent scenes in which no event or object of interest is captured.

In an alternative embodiment, imaging system 202 generates one quality level of video data to be stored in data storage system 206. Network camera 102 includes a scalable video codec, such as MPEG-4 SVC. After the video data are analyzed by video analytics 304 and stored in data storage system 206, portions of the video data may be processed using the scalable video codec to generate a second quality level (multiple quality levels may be generated using the SVC). For example, network camera 102 generates and data storage system 206 stores HiQ video data. Sometime later (e.g., minutes, hours, days), the quality level of portions of the HiQ video data that represent the nonoccurrence of an event of interest are reduced to LowQ.

Storage management system 306 can also implement storage management policies that dictate how long portions of video data are stored in data storage system 206 based upon content. For example, storage management system 306 can control data storage system 206 such that important events are retained for long periods of time while less important video data are replaced with new video data within a short period of time. Storage management system 306 also controls communication of video data between sub-storage units of data storage system 206 as described below. One goal of storage management unit 306 is to minimize the frequency of writing operations from a first sub-storage unit to a second sub-storage unit.

Because video data generated by network camera 102 are stored in data storage system 206 within the camera housing of network camera 102, the video data may be more vulnerable to damage or theft. For example, if an intruder steals network camera 102, the intruder would also have in his possession the video data. Because network camera 102 includes video analytics 304 and data storage system 206, numerous features may be implemented in system 100 to secure video data from loss or unauthorized viewing in the event that network camera 102 is stolen. For example, when an event of interest (e.g., detection of an intruder) is detected by video analytics 304, the video data representing the event of interest may be immediately streamed, or sent as video files, to remote storage unit 116, or to another network camera 102, for redundant storage. Also, shortly after the event of interest is detected, an alert and a video clip file representing the event of interest may be sent to central monitoring station 104 or remote user 114 before network camera 102 is tampered with. To prevent an intruder from viewing images captured by network camera 102, video data stored in data storage system 206 is encrypted so that the intruder cannot play back the video data. Also, video data streamed or sent as video files from network camera 102 may be encrypted to prevent unauthorized viewing.

Imaging system 202, video analytics 304, rules based engine 302, storage management system 306, and data storage system 206 cooperate to establish a content-aware storage system. The content-aware storage system provides a number of unique benefits not available in traditional camera systems (even those camera systems that include some form of video analytics or small capacity storage). With the content-aware storage system, storage capacity needs can be greatly reduced by intelligent recognition and classification of video visual content. Storage capacity needs can be greatly reduced even for applications that require substantially continuous operation of network camera 102. For example, when an event of interest is captured, the content-aware storage system can record the event at a HiQ level. When an event of interest is not being captured, the content-aware storage system can record the video data at a LowQ level. The quality level of stored data, therefore, can be matched to the importance of the content.

Because LowQ video data may be stored when no event or object of interest is being captured, data storage system 206 may include practical storage capacity, for example 80 GB, and still be able to store video data spanning long periods of time (for example, one or two months). In comparison, a typical 01 resolution 30 fps system without content-aware storage can require over 360 GB of storage for one month. Thus, typical video cameras have not been able to include a mass storage unit that can store video data spanning a long period of time. Also, because network camera 102 includes data storage system 206, video data may be stored despite network failure or network downtime due to system upgrades or maintenance. Separate networks no longer need to be set up for network cameras; network cameras can be installed on the same data network used at a particular site, saving installation costs and ongoing maintenance costs. Also, because network camera 102 includes data storage system 206, the capacity of remote storage unit 116 may be greatly reduced and remote storage unit 116 may serve primarily as backup or archival storage of important events. Also, data storage system 206 eliminates the need to include traditional DVRs and NVRs in network camera system 100.

Additionally, because network camera 102 includes data storage system 206, network bandwidth demands can be greatly reduced because network camera 102 does not have to continuously supply video data over network 106 to remote storage unit 116. Instead, network camera 102 can supply a managed amount of video data to remote storage unit 116. For example, network camera 102 may supply HiQ or LowQ video data over network 106 only when an event or object of interest is being captured. For example, events or objects of interest may be captured only ten percent or less of the time in a typical camera system. During the other 90% of the time, a user may choose to send only LowQ video data over network 106, or to send no video data at all. For wireless network 112, because network bandwidth demands are lower, more wireless network cameras 102' can be added to wireless network 112.

Because video analytics 304 can detect when an event or object of interest is being captured, the data and metadata associated with the event or object of interest can be automatically archived in remote storage unit 116 to provide added redundancy and fault tolerance. Transmission of alarm information and video data to central monitoring station 104 or remote user 114 may also be prioritized based on importance of the video visual content.

Also, because of the content-aware storage system, users can categorize different events or objects of interest by assigning priority values. The video data associated with the events or objects of interest can be stored intelligently in data storage system 206 for preset time periods that vary based upon the priority values.

For example, less important events may be deleted after one month, but more important events may be stored for three months, six months, or a year. Also, when combined with the scalable video codec capabilities of imaging system 202, video data can be retained in data storage system 206 but reduced according to different resolutions and frame rates based upon the video visual content so that the video data take up less space.

Figure 4:
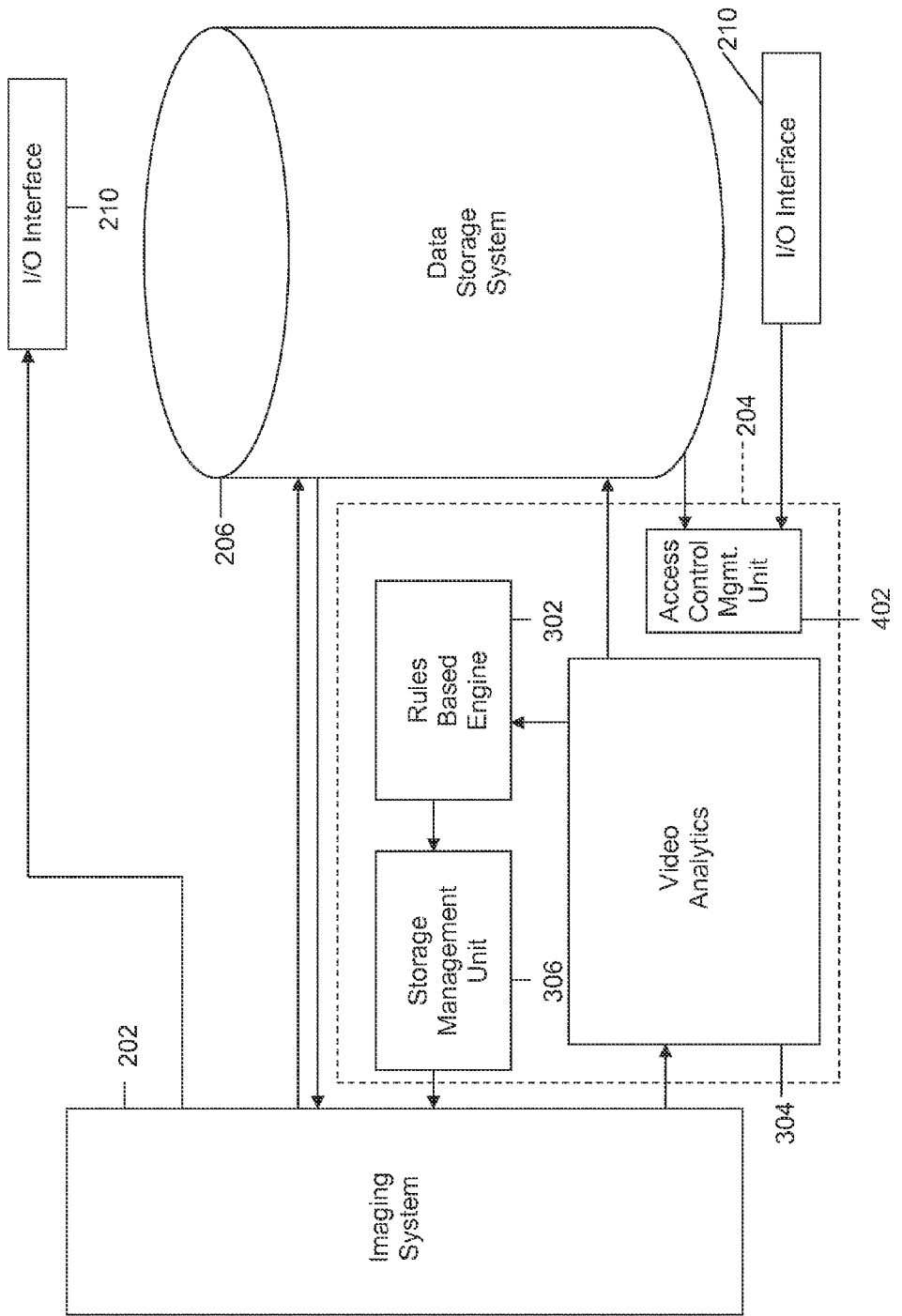
FIG. 4 is a block diagram depicting an access control management unit operating in the video processing system of the first embodiment of FIG. 3.

Because video analytics 304 generates metadata that can be stored in data storage system 206 and remote storage unit 116, access to video data stored in data storage system 206 and remote storage unit 116 may be controlled based on content. Also, access to live video data may be controlled as metadata is created corresponding to the video data. As depicted in FIG. 4, video processing system 204 may include an access control management unit 402, which is preferably implemented in software. According to rules in rules based engine 302, different content security levels are assigned to different events or objects of interest so that access to video data may be controlled according to content. Also, different users have one or more security levels assigned to them—the security levels corresponding to one or more of the content security levels. Access control management unit 402 controls access to stored video data such that a user may access only the video data that include a content security level corresponding to the user's security level. Security managers, for example, may access video data flagged for security breaches or threats, but may be prevented from accessing video data that have been captured for business or marketing purposes. Likewise, marketing personnel may access video data identified for their applications but not access video security data. Policies on video encryption may also be controlled based upon content.

The content-aware storage system may also intelligently distribute stored video data to maximize the available storage capacity. For example, to meet its storage needs, a first network camera 102 may need only one-half of the capacity of its data storage system 206, while a second network camera 102 may require more storage capacity than the capacity of its data storage system 206. Video data from the second network camera 102 may be supplied over network 106 to the first network camera 102 to be stored therein. Because data storage system 206 of one network camera can store data of another network camera, the total storage capacity in the system 100 can be maximized and redundant storage of important data may be distributed throughout system 100. Maximizing total storage capacity and distributing redundant storage of important data make the important data more immune to tampering or failure. Additionally, storage transfer could take place at low bandwidth times of the day.

The content-aware storage system also allows network camera system 100 to be easily scalable. In conventional systems, as the number of cameras increases, storage capacity must increase by adding units to a remote storage facility. Moreover, processing power must increase by adding units to a central processing facility. With a content-aware storage system, remote storage and processing facilities do not require upgrades as network cameras 102 are added to network camera system 100. Instead, each network camera 102 contains its own storage capacity (via data storage system 206) and processing power (via video processing system 204). Thus, when a network camera 102 is added to network camera system 100, the storage capacity and processing power increase simultaneously.

Second Embodiment of Content-Aware Storage

Figure 5:
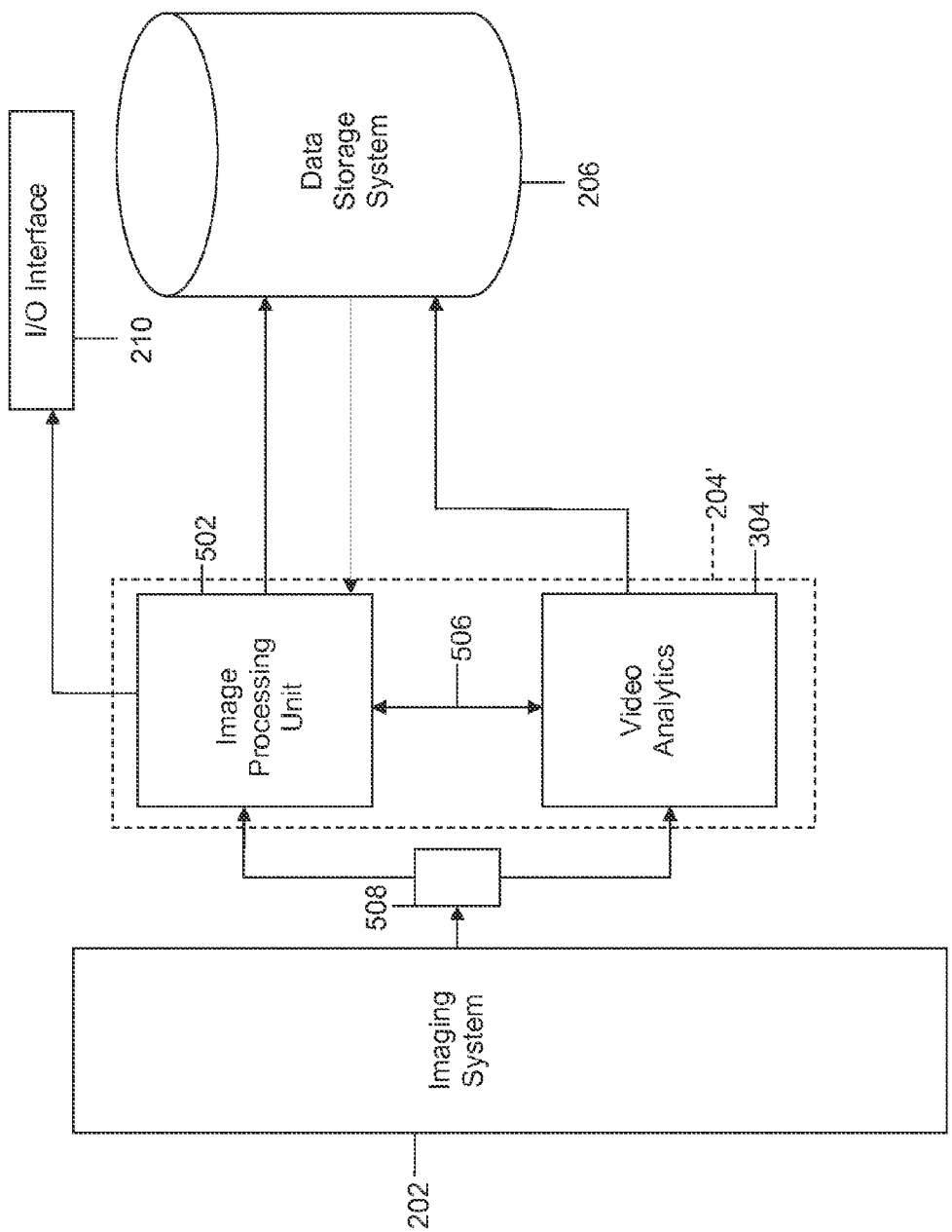
FIG. 5 is a block diagram depicting a second embodiment of the imaging system, video processing system, and data storage system of FIG. 2.

A second embodiment of camera 102 is described with reference to FIG. 5 and includes imaging system 202, video processing system 204', and data storage system 206. Video processing system 204' of the second embodiment includes video analytics 304 and an image processing unit 502. Image processing unit 502 generates video data to be communicated to central monitoring station 104 and stored in data storage system 206 and remote storage unit 116. Image processing unit 502 may be capable of compressing D1 resolution video data according to the H.264/AVC standard at 30 fps. Image processing unit 502 may be, for example, a Freescale Semiconductor® i.MX27 multimedia applications processor. Video analytics 304 analyzes data to determine whether the data contain predetermined types of content. Video analytics 304 may be capable of performing MPEG4/CIF encoding. Video analytics 304 may also deliver video data to a PAL/NTSC monitor (not shown). Video analytics 304 may implement, for example, a Texas Instruments DaVinci™ DM6437 Digital Video Development Platform. Additionally, image processing unit 502 and video analytics 304 may communicate with each other through an inter-processor bridge 506.

Video data generated by imaging system 202 are supplied to image processing unit 502 and video analytics 304. Each frame of video represented in the video data receives a time stamp, which is applied by a timestamp block 508 that is positioned between imaging system 202 and image processing unit 502 and video analytics 304.

Image processing unit 502 will now be described in more detail with reference to FIG. 6. Image processing unit 502 includes a first encoder 602, a second encoder 604, streaming and archive control unit 606, rules based engine 302, access control management unit 402, and storage management system 306. Streaming and archive control unit 606, rules based engine 302, access management unit 402, and storage management unit 306 may be implemented in software. First and second encoders 602 and 604 may be implemented in hardware as application specific integrated circuitry or in software. First and second encoders 602 and 604 receive the video data generated by imaging system 202. First and second encoders 602 and 604 encode the video data at two different quality levels. As described above, a quality level refers to a number of video processing parameters including resolution, frame rate, bit rate, and video compression quality. First encoder 602 encodes the video data at a HiQ level to produce HiQ video data, and second encoder 604 encodes the video data at a LowQ level to produce LowQ video data.

Figure 6:
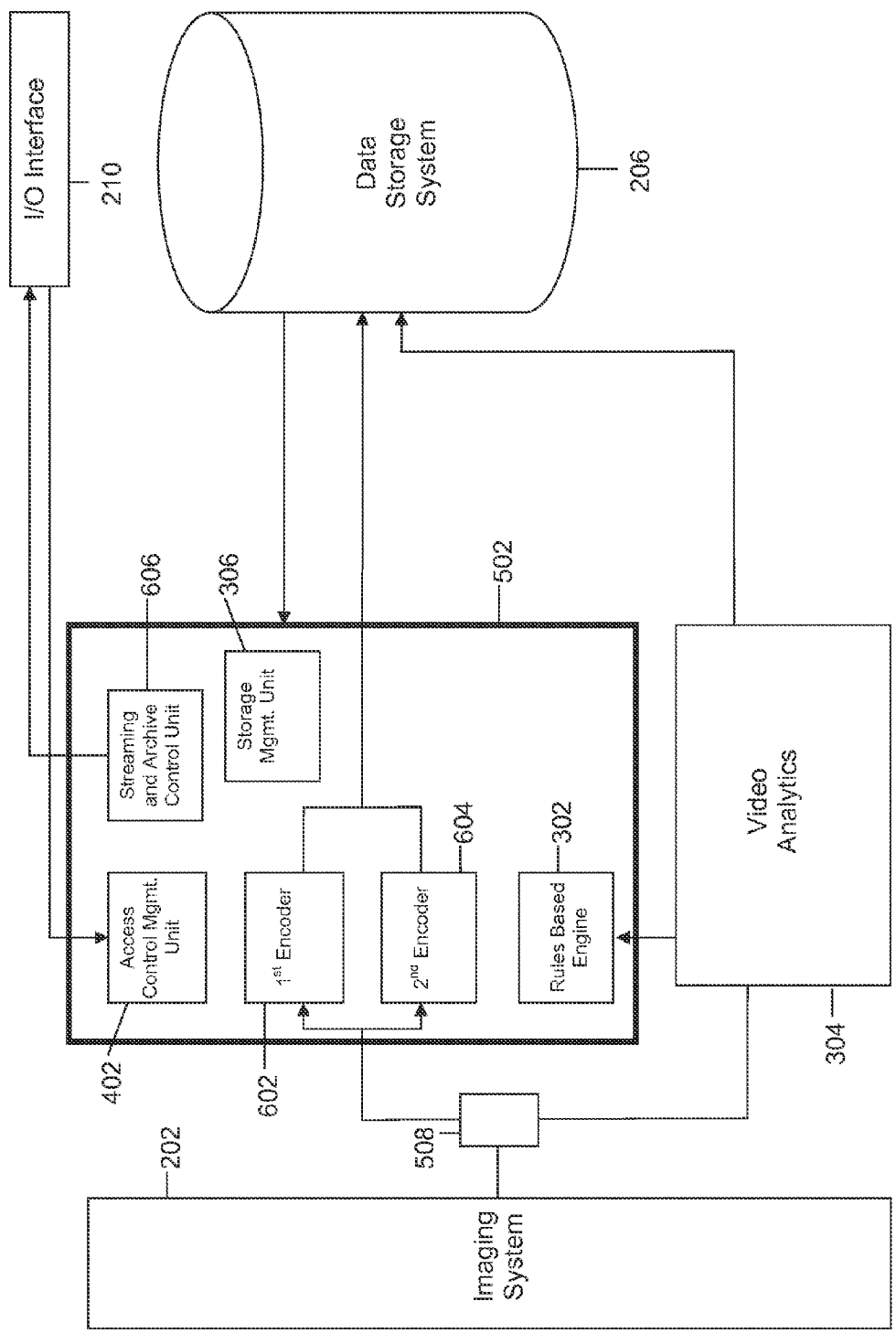
FIG. 6 is a block diagram depicting portions of the video processing system of the second embodiment.

Although two encoders are depicted in FIG. 6, image processing unit 502 may include more than two encoders to produce several streams video data of multiple quality levels, or the quality levels of a single encoder may change based on the type of event detected by video analytics 304. Preferably, encoders 602 and 604 can encode video data simultaneously. For example, encoder 604 encodes the video data continuously and encoder 602 encodes the video data only when an event of interest is detected such that, when an event of interest is detected, encoder 602 encodes the event at a LowQ level while encoder 604 encodes the event at a HiQ level. Continuous recording of LowQ video data and intermittent recording of HiQ video data substantially reduce storage resource requirements. For example, a 24-hour period may include approximately five hours in which an event of interest is being detected. If network camera 102 recorded five hours of 01 resolution video at 15 fps using H.264 compression, those five hours would require approximately 0.86 GB of storage. If network camera 102 also recorded 24 hours of CIF resolution video at five fps using H.264 compression, the 24 hours would require approximately 0.4 GB of storage for a total of 1.26 GB/day. If data storage system 206 of network camera 102 included 80 GB of storage, data storage system 206 could record approximately two months of video. In comparison, a typical camera that continuously records 01 resolution video at 15 fps using MPEG-4 compression requires approximately 5.4 GB of storage per day. Thus, a typical 16 channel video system requires approximately 5 TB of storage for a two-month period.

Continuous recording at LowQ is desirable in case video analytics 304 misses the occurrence of an event of interest. In many cases, it is necessary to have a capability of verifying that no event happened during a period of time, such as, for example, a situation in which a customer claims to have slipped and fallen in a retail store when in fact the customer did not slip and fall. The LowQ video data can be reviewed by a user to view the event missed by video analytics 304. Thus, LowQ video data can be continuously recorded to ensure that nothing has been missed, while HiQ video data are recorded when important events have been detected by video analytics 304.

One or both streams of HiQ and LowQ video data are supplied to data storage system 206 and streaming and archiving control unit 606, depending on video visual content and defined rules of rules based engine 302. Streaming and archiving control unit 606 facilitate communication of live HiQ and LowQ video data, video data stored in data storage unit 206, video clip files representing events of interests, and alarms to central monitoring station 104, remote storage unit 116, and remote user 114. For example, after an event of interest is captured and stored in data storage system 206, HiQ video data representing the event of interest stored in data storage system 206 may be communicated to remote storage unit 116, via streaming and archiving control unit 606, for redundant storage of the event of interest.

Rules based engine 302 receives metadata produced by video analytics 304 and determines from the metadata whether the HiQ or LowQ video data are to be stored in data storage system 206 and/or communicated to central monitoring station 104, remote storage unit 116, and remote user 114.

Access control management unit 402 controls access to live and stored video data. Access control management unit 402 allows multiple user accounts to be created with corresponding permissions to access portions of video data based upon the content of the video data.

Storage management system 306 is intelligently driven by the metadata generated in video analytics 304 and the rules defined in rules based engine 302. Storage management system 306 also controls communication of video data between sub-storage units of data storage system 206.

In operation, imaging system 202 captures a field of view and generates video data. Frames of the video data are timestamped by timestamp block 508 so that metadata generated by video analytics 304 may be synchronized with video data generated by image processing unit 502. Video analytics 304 analyzes the video data generated by imaging system 202 and generates metadata based upon the content of the video data. First encoder 602 and second encoder 604 also receive the video data generated by imaging system 202 and generate, respectively, HiQ video data and LowQ video data.

The metadata is communicated to rules based engine 302 over inter-processor bridge 506 and rules based engine 302 determines whether a rule has been violated (i.e., whether an event or object of interest detected by video analytics 304 requires action). Based on the metadata and the rules of rules based engine 302, storage management system 306 controls first encoder 602 and second encoder 604 to supply HiQ video data and/or LowQ video data to data storage system 206. Portions of the HiQ and LowQ video data may be segmented into video clip files. Storage management system 306 also controls whether to send HiQ or LowQ video data, via streaming and archiving control unit 606, to central data storage unit 116.

For example, if the metadata communicates that no object or event of interest is being captured within the field of view of network camera 102, a rule may communicate to storage management system 306 to control first and second encoders 602 and 604 such that the LowQ video data are supplied to data storage system 206 and no video data are supplied to remote storage unit 116. In an alternative example, if the metadata communicates that an object or event of interest is occurring within the field of view of network camera 102, a rule may communicate to storage management system 306 to control first and second encoders 602 and 604 such that HiQ and LowQ video data representing the object or event are supplied to data storage system 206. Because both HiQ and LowQ video data are stored in data storage system 206, the event of interest may be played back in a higher bandwidth or lower bandwidth mode. Also, when an event of interest is captured, a video clip file of the event of interest stored in data storage system 206 may be communicated to central monitoring station 104 via streaming and archiving control unit 606. A video clip file may be a short HiQ video segment of the event of interest that is stored in data storage system 206. A video clip file may represent seven seconds of video in which two seconds are before the event occurs and five seconds are after the event is detected. The duration of the video clip may be programmed to be any length. The video clip file may be played back multiple times, forwarded to other users via email, or stored on a removable disk and sent to, for example, law enforcement. As described in the first embodiment, users may define any combination of actions to be taken based upon the metadata, such as storing HiQ video data in data storage system 206 and remote storage unit 116 while simultaneously streaming LowQ video data to central monitoring station 104. Users may also define a rule that an alert be sent to central monitoring station 104 or to remote user 114 via email whenever an event or object of interest is detected. For example, remote user 114 may receive an alert on a mobile device such as a cellular phone or personal digital assistant (PDA), together with a video clip that can be played on the mobile device.

Although the above embodiments have been described, network camera 102 is not limited to these two embodiments. Network camera 102 may include a camera system having any degree of resolution and having a capability of analyzing the content of video data to detect motion or another event of interest, storing the video data in the camera, and sending video data of the events of interest to remote storage.

Third Embodiment of Content-Aware Storage

As described in this section, content-aware computer networking devices (also referred to as network infrastructure devices) improve the quality of service in hybrid networks that include both sensor networks and data networks (e.g., conventional IT networks).

Many conventional network infrastructures are optimized for traditional data networks primarily carrying client-server models of communication in which servers are data rich and are outnumbered by clients requesting data. Clients request data from the servers and the client-side communications occur in bursts. For example, in the case of server-hosted video streaming, a small number of servers multicast or unicast information to a larger number of clients. This one-to-many transmission of video streams is a basic assumption underlying storage and bandwidth optimization techniques found in conventional computer networking devices deployed in bandwidth-intensive applications. Thus, one-to-many streaming applications employ algorithms for eliminating redundant transmission of information in the network. For example, if multiple clients in a subnet are receiving the same packet of information, the packet can be sent once to the router for that subnet. The router multicasts the single packet to multiple clients as needed. If the sharing of information among the clients in a subnet is not contemporaneous, various peer-to-peer (i.e., client-to-client) information exchange protocols can be used to minimize network congestion at the server side. The BitTorrent algorithm, for example, leverages peer-to-peer information exchange to avoid burdening a server with asynchronous requests from multiple clients for the same packet of information.

Many-to-one data transmission models are inherently different and often require increased bandwidth and storage resources vis-a-vis the one-to-many transmission model. For example, sensor and data networks have distinct data transmission behavior that has been inadequately addressed in the design of conventional network infrastructure devices.

Figure 9:
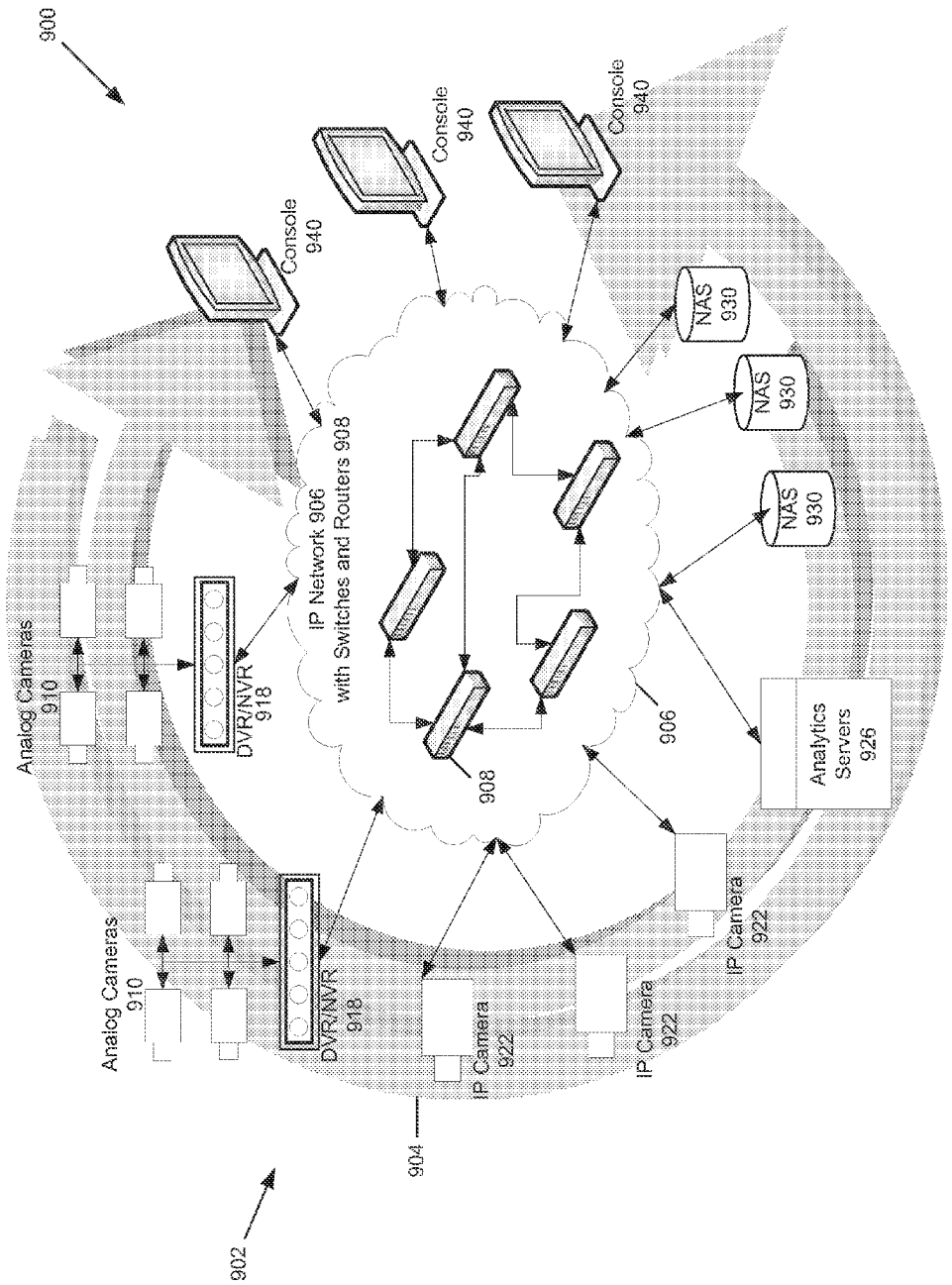
FIGS. 9 and 10 are high-level computer network diagrams depicting video surveillance network camera systems that include network communication paths between network video cameras and, respectively, conventional and content-aware computer networking devices.

FIG. 9 shows a video surveillance network camera system 900 including sensor devices 902 (in the foreground of an arrow indicating a sensor network 904) and a data network 906 (in the cloud encircled by sensor network 904) that includes network infrastructure devices 908 of conventional type. Sensor devices 902 include analog cameras 910 operatively communicating with DVR or NVR devices 918, IP cameras 922, analytics servers 926, network attached storage (NAS) devices 930, and console workstations 940 that may include user equipment interfaces for displaying video stream. In sensor-client (many-to-one) applications, the large number of sensor devices 902 transfer video streams of scenes observed by cameras 910 and 922 to a small number of clients, e.g., servers 926 or consoles 940. The one-to-many assumptions underlying conventional infrastructure hardware optimizations are less effective for communicating sensor data. Each transport protocol in traditional data network models assumes that all information is equally important. In the case of connectionless protocols such as UDP/IP, the source of the information is implicitly notifying the network that dropping a limited number of randomly selected packets is acceptable. In the case of streamed video, transmission protocols are designed to accept packet loss either due to network failures or due to dynamically selecting scalability options according to various data compression schemes. In contrast with data packets, all sensor packets are not equally valuable. But until the value of the information is assessed, each packet is necessarily of the highest value. Thus, for sensor networks, packet loss is unacceptable and the traditional streaming model is stressed to an extreme.

Figure 10:
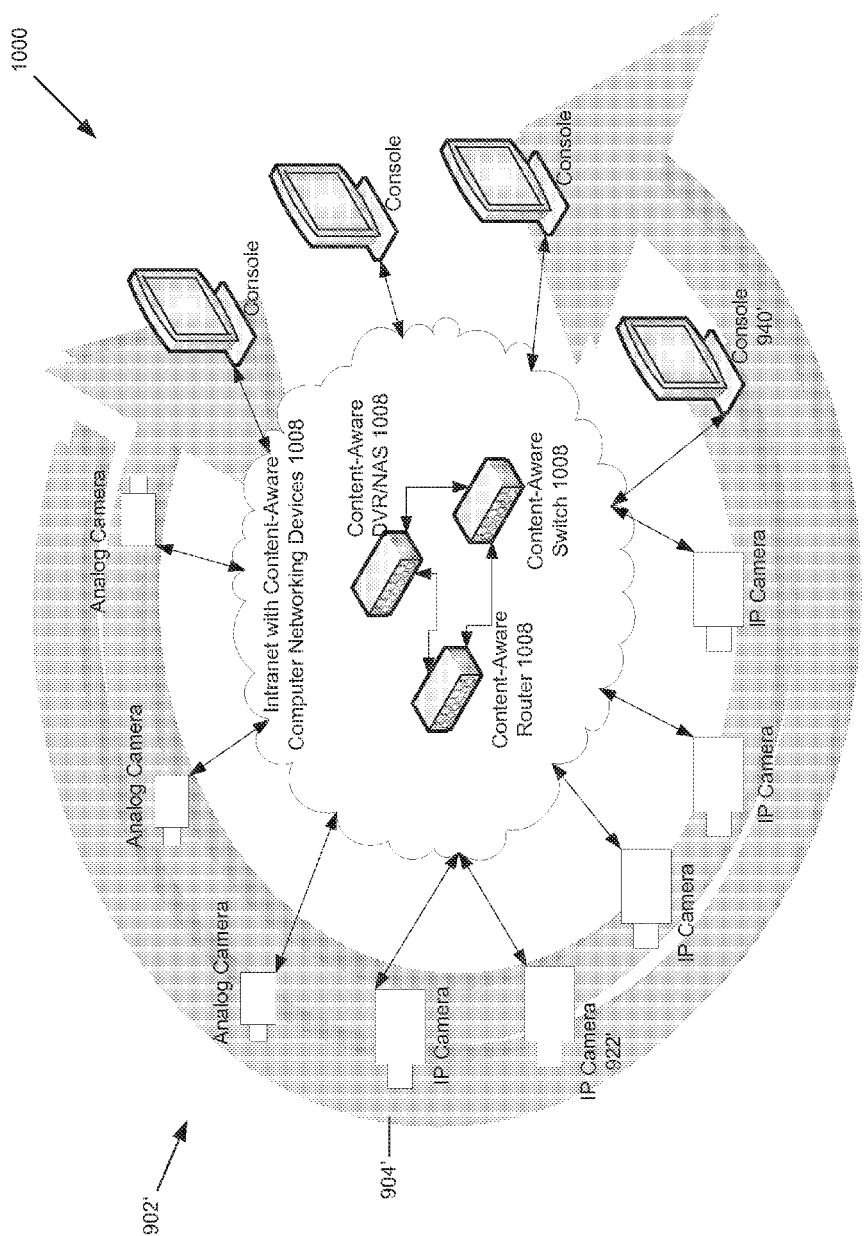

The present inventors recognized that many-to-one streaming applications, however, could employ algorithms to reduce the diversity and quantity of information streamed over the network. As shown in a video surveillance network camera system 1000 of FIG. 10, bandwidth and storage resources are reduced by transporting processing (data valuation) tasks to the data as opposed to transporting data to the processing tasks. Thus, in contrast to system 900, where all packets have to be delivered (even using a best-effort scheme), content-aware computer networking devices 1008 in communication with sensor network 904' can act on processed packets (i.e., the value of the information packet has been determined) in the following three distinct ways: (1) package, store, and notify—the switch or the router can appropriately transcode high value sensor information, optionally store the data locally and transmit the information to the appropriate recipient; (2) package and store—the switch or the router can package and store low value information locally. Such information might be retrieved at some later time by the user, but no real-time action is desired and information need not be transmitted further; or (3) discard—information with no value can be discarded without being propagated through the network. In other words, content-aware routers and switches are capable of analyzing and summarizing the information content in data, assessing the value and priority of the content, and determining the appropriate destination for valuable content.

For surveillance networks, transporting processing (data valuation) tasks to the data implies that analytics and storage could be, advantageously, located in close proximity to sensors 902'. Furthermore, content-awareness in computer networking devices operating on sensor data could extend beyond the conventional coarse categorization of critical and non-critical communications used for characterizing audio and visual data in conventional data networks. For example, communications could also be assessed by the relative value and priority of individual packets of video and audio. Moreover, note that it is not always possible to endow sensors with the necessary processing capacity to run all video analytics algorithms. Thus, in some embodiments, processing is performed by switches, routers, or other content-aware devices that relay information from the sensors to various computational, storage and display nodes in the network.

Traditionally, sensor networks have been separated from IT networks explicitly. Communication between these disjoint networks has been non-existent or limited. But as the level of sophistication and the breadth of applications of sensor networks increase, disjoint network infrastructures have been found to be both limiting and costly.

Rather than separating the network infrastructure for video surveillance applications from other data applications, video surveillance network camera systems have been deployed as an application in IT networks. Increasingly, security and surveillance systems are becoming IP-based solutions sharing a facility's IT network infrastructure. While transport-level computer networks and sensor networks have similar infrastructure, their inherently different data transmission statistics benefit from different packet routing mechanisms. The different routing mechanisms consequently affect the behavior and capabilities of the switches and routers in the IP network. Careful consideration of sensor network related issues is paramount. An improper design can lead to congestion and poor quality of service for the whole network. For example, urgent alarm events might not be reported fast enough if prioritized at a low level, yet raising the priority of all sensor network data can unnecessarily burden all other data applications.

Hybrid (data and sensor) networks can provide much greater quality-of-service by incorporating sensor data processing components directly into certain network infrastructure devices. For example, content-aware routers and switches that incorporate video analytics and an information valuation mechanism within their operation logic remove network congestion. This disclosure seeks to overcome an increasingly important limitation in security and surveillance sensor networks: Existing IP network infrastructure devices are not designed to handle hybrid data and sensor network applications. With the help of the content-aware switches and routers proposed in this document, IT networks will be able to support both data and sensor networks effectively.

The following 10 paragraphs discuss four examples of previous attempts for endowing computer network devices with application-specific processing capabilities. These paragraphs also contrast the examples with content-aware computer networking devices including video analytics and local mass storage devices.

First, active networks allow custom applications to be deployed as services within the network infrastructure. Such custom applications could include, for example, caching of streamed media, transcoding video for specific clients, running specific filtering operations on data, or other applications.

Compared to active networks, content-aware devices are task specific and optimized for hybrid network architectures. The task specificity greatly simplifies the design and related network security protocols. Also note that while active networks are fairly general in design, their main goal is to provide services that transmit information across a data network. Content-aware devices have the additional options of either storing information locally without transmitting it or discarding the information altogether. Thus, content-aware devices are designed and optimized to cater only to deployable services that can separate sensor data packets from other data packet types; analyze and summarize the content of the sensor data packets; determine the value and priority of the packet; dynamically determine the destination of the packet; and locally store information for an extended time period.

Second, a variant of the active networks concept is the notion of Extensible Networks. Extensible networks are similar to active networks in that they allow application-specific services to be deployed in the network, but they differ in that the services can dynamically change. Extensible networks perform services as plugins in routers and switches and an Extensible Network Planner is used to determine the deployment strategy for the plugins. Other somewhat relevant approaches include NodeOS, OpenSig, multi-control architectures, and other derived methods.

Active and extensible networks are could be deployed in sensor networks. For example, active networks allow for the transportation of not only raw data, but also of programs that operate on the raw data. Thus, these technologies offer a generalized framework for addressing the design of network infrastructure devices that are capable of handling both data and sensor nodes. The generality afforded by active network devices also makes the implementation of control protocols and security measures incredibly complex.

While the broad on-the-fly customization capabilities of active network routers and switches could, in theory, provide a basis to address the issues in hybrid data-sensor networks, a simpler, but equally effective approach is to incorporate content-aware computer networking devices in the network. This allows for sensor network applications to perform optimally in resource sensitive hybrid data-sensor networks. At the same time, these content-aware devices reduce cost and complexity of the network design.

Figure 11:
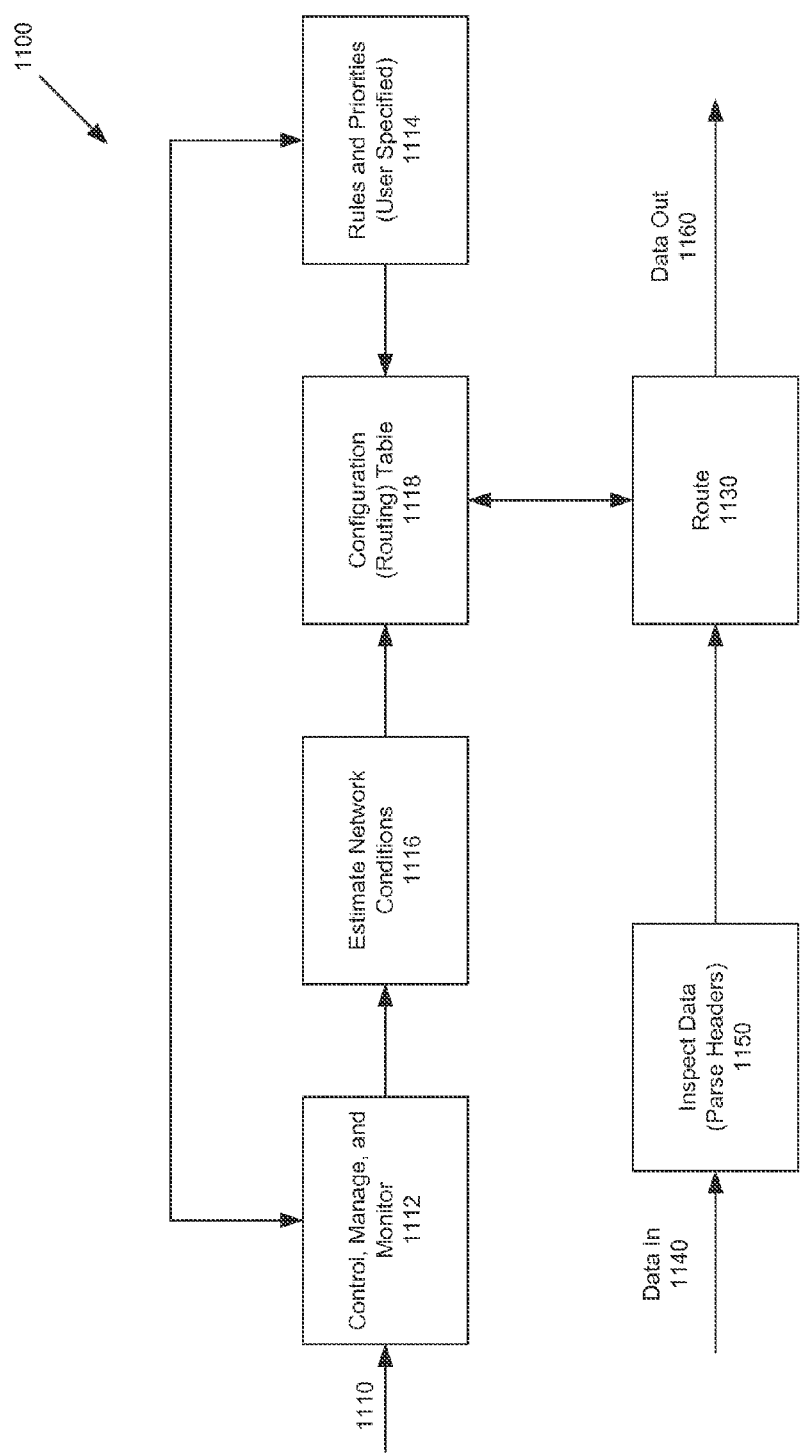
FIGS. 11 and 12 are block diagrams showing functional modules of, respectively, a router of conventional type and a content-aware router including video analytics.

Third, as noted previously in the Background Information section of this document, some conventional switches and routers have rudimentary abilities to coarsely assess data and network conditions. FIG. 11, for example, shows functional blocks of a conventional router 1100 operating at Open System Interconnection (OSI) Model Layer 3. Router 1100 includes a configuration access port 1110 that a user can connect to for configuring a control, manage, and monitor block 1112. Control, manage, and monitor block 1112 communicates these user preferences back to user (when requested) and on to a rules and priorities block 1114. Control, manage, and monitor block 1112 also provides criteria for use by an estimate network conditions block 1116. A configuration and (routing) table block 1118 configures network data routes by using network condition information (e.g., latency or congestion) received from estimate network conditions block 1116, and user-specified rules and priorities from rules and priorities block 1114 for controlling data routing at a route block 1130. Data received at a data in port 1140 is inspected (e.g., packet headers are parsed) at an inspect data block 1150, and routed from a data out port 1160 by route block 1130. Router 1100 performs customized filtering operations on the data it transmits. The most common application of such filtering operations is router-embedded virus and worm detection systems. Such routers run pattern-matching algorithms in a content agnostic fashion in an effort to detect malicious code in generic data. Filtering methods are also used to gather data transmission statistics and infer behaviors that might be consistent with attacks on a network or an unauthorized intrusion. In addition to network security applications, filtering mechanisms can also be used to dynamically select scalability options in various video and audio codecs as a function of network conditions and the capabilities of the recipient. Such transcoding applications are usually content agnostic and treat high and low value information similarly. Skilled persons will recognize that a switch operating at OSI Model Layer 2 includes similar functionality, but operating based on MAC-layer addresses instead of IP-layer addresses.

Figure 12:
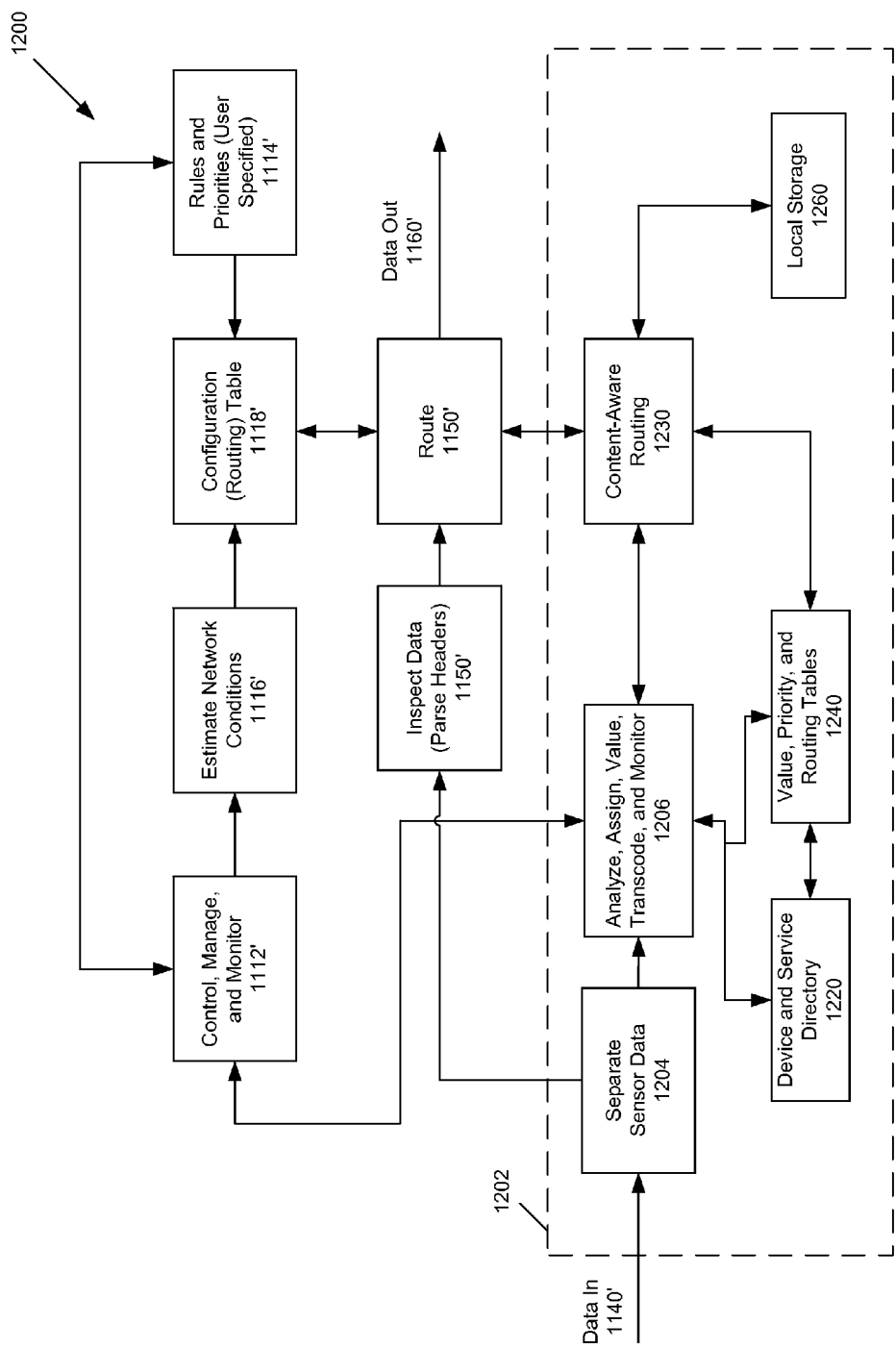

Compared to traditional switches and routers that are solely responsible for transmitting data, content-aware devices, such as a content-aware router 1200 of FIG. 12, support content-specific processing and local storage of data. Router 1200 is similar to router 1100, but router 1200 includes content-aware functionality shown in a block 1202. Block 1202 includes a separate sensor data block 1204 that allows data packets to bypass block 1202 while forwarding sensor data packets to an analyze, assign value, transcode, and monitor block 1206. Block 1206 analyzes by video analytics video visual content of sensor data (e.g., video streams) to provide managed video representing, at specified quality levels, samples of scenes observed by one or more network video cameras. Block 1206 also provides configuration information to a device and service directory block 1220, content-aware routing block 1230, and value, priority, and routing tables block 1240. The configuration information, for example, include information for block 1220 concerning other content-aware devices and capabilities, and information defining an event of interest in a scene observed by a network video camera video stream such that the event of interest may be depicted in video visual content. In general, the configuration information configures block 1202 to prepare and distribute the managed video in response to the video analytics detecting the event of interest. Block 1202 also includes a local storage block 1260 for storing the managed video in a local mass storage device that is contained in or connected to a housing of the content-aware computer networking device. Content-aware routing block 1230 distributes the managed video through at least one of network communication path such that distribution of the managed video consumes substantially less network bandwidth than would be consumed by delivery of the associated network video camera video stream at a specified quality level in the absence of analysis by block 1202.

Specifically, some differences between traditional switches and routers and those proposed are as follows: (1) Content-aware network infrastructure devices are designed for both one-to-many (data networks) and many-to-one (sensor network) data transmission models. (2) The value of sensor information packets is ascertained using advanced machine learning algorithms (analytics) right at the switch, router or the sensor (where possible). (4) To the extent possible, a high-bandwidth raw sensor data stream is converted to a lower-bandwidth event stream. (5) Depending on the nature of the sensor data (determined by analytics), the destination of the packet is determined by the switch or the router. (6) Switches and routers are endowed with the capability to store data (much like DVRs) so that valuable packets that are not time-critical need not be propagated through the network. Instead, they can be stored locally at the switch or the router until the information is requested. (7) Time critical sensor packets are guaranteed to be delivered to their destination within a predefined maximum permissible latency (subject to hard network infrastructure limitations). (8) Available network bandwidth is divided appropriately between the sensor network and the data network. Neither the data network nor the sensor network is allowed to overwhelm the other. (9) The scalability options in a compressed sensor data stream are chosen by switches and routers depending on the value of the stream and existing network conditions.

Fourth, DVRs and NVRs are commonly deployed in security systems. Some such devices have embedded video analytics. But, while this information is used to generate alarms and trigger event-based recording, DVRs and NVRs operate at the center of the sensor network and do not contribute to managing bandwidth and promoting scalability.

Compared to intelligent DVRs and NVRs, content-aware routers and switches operate at the network infrastructure level as opposed to the center of the network. DVRs and NVRs mainly offer information storage capabilities and not necessarily data switching or routing capabilities. While some DVRs offer built-in analytics capabilities, they are used mainly as alarm generators and not as a mechanism to determine information value to optimize storage and transmission. Moreover, these devices are not sensitive to network conditions and thus, do not offer the level of fault tolerance for sophisticated IP surveillance and security applications.

At the heart of content-aware infrastructure devices is a mechanism to analyze and value packets of information. The value of information is necessarily influenced by context provided by a human operator. But the raw sensor data has to be synthesized in a manner such that the assessment of value is possible. This synthesis is powered by a variety of analytics algorithms. Value is assessed based on user supplied rules conditional on the synthesized "summary" of raw sensor data. The value assessment mechanism performs the following actions: (1) Synthesize a summary of sensor data with the appropriate amount of detail. (2) Based on user-supplied rules, detect the occurrence of events in the summary. Note that the rules are conditional on the descriptors in the summary. The descriptors are sometimes referred to as "metadata." (3) Based on the user-supplied rules, assign value to the detected events. (4) Based on the assigned value, the time when the event occurred and the probability with which the event occurs, assign a priority to the event. Note that priorities are used by the sensor network to guarantee QoS. The priorities, although related to the user-specified event values, are not always perfectly correlated.

Analytics algorithms can be viewed as hierarchical summarization methods for raw sensor data. Consider the example of data from a video sensor. A summary of the data from the video sensor contains the following two main categories of information: (1) A description of the scene: The description could simply be an image or it could contain information about identified static objects or structures in the scene. For example, a scene could contain foliage, buildings, fences, paths, or other visual features. While some of these objects and structures are automatically determined by the analytics algorithms, some might also be specified by a user. (2) A script describing the activity in the scene: Much like a script describing all activities in a play or a movie, the script generated by analytics algorithms describes all activities observed by the video sensor. The script is a textual summary of video data and thus, it can be searched and parsed. The script contains a hierarchical summary of the activity in a scene. At the highest level, the summary might only contain information about the number of actors or objects. Lower levels contain information about the identity of the actors, their actions and interactions, intentions, or other information. A particular camera could capture a sequence of frames containing a person climbing a fence. At a high level, the sequence can be summarized with a tag such as "Person Detected." At the next lower conceptual level, the tag could contain information about the person's actions. The next level could contain a description of the person's appearance, and so on.

Summarization is not limited to data from individual sensors. Sensor data from multiple sensors could be correlated and summarized. A simple example of multi-sensor information correlation is tracking an object across multiple cameras. When an individual walks through the field of view of a sensor network, the network realizes that it is the same person and summarizes and annotates (tags) the sensor data appropriately. Thus, depending on the user-specified rules, the value of information could change as information is aggregated at various infrastructure nodes in a sensor network. A person walking through a single sensor's field of view might be unimportant, but when the person walks through the fields of view of a particular sequence of sensors, the event might deserve attention.

A variety of analytics algorithms exist that attempt to effectively summarize a sensor's observations. Basic synthesis and summarization of sensor data involves three important analytical steps: (1) detection, (2) classification and (3) tracking. Classification and tracking can also be a consequence of information aggregation and synthesis in a sensor network. This basic summarization identifies the actors and objects of interest in the field of view of the sensor network. At the next level, the activity of each of these actors is identified. Examples of activity for humans include "walking," "running," "lingering," or other activities. In some cases, scene-specific activity such as: "climbing fence" might also be identified. Once individual activities are determined, interactions can be identified. Interactions for humans could include interactions between two or more people, between a person and other dynamic objects in the scene, between a person and static objects in the scene, or other interactions. Identification of interaction could also include "macro" behaviors such as the presence and size of a crowd. Depending on the capabilities of the sensors in the network, detailed identification of individuals and objects is also possible. For humans as an example, if a sufficiently high resolution image of the face is available, a face recognition algorithm can be used to identify the person. Similarly, the make and model of a vehicle can also be identified. Available audio sensors in the network could also help in identifying various sounds, performing speech recognition, or other recognition, and this information can be correlated and aggregated with information coming from other sensors. The synthesized summary forms the script for the observations of a single sensor and also of the sensor network.

User specified rules accomplish two distinct goals: (1) Map synthesized summaries containing metadata (descriptors) to events. (2) Assign a value to the event and optionally specify an action in response to the event. Thus, based on the summary generated by the analytics algorithms, content-aware infrastructure devices can map raw sensor data to events with associated values. Note that user specified action in the context of infrastructure devices typically deals with what information should be included along with the event and how the events should be dispatched (i.e., stored at a NAS, sent immediately to an operator's workstation, mobile communication user equipment device, or other location).

With reference to FIGS. 11 and 12, it is noted that existing switches and routers are designed to optimize speed, scalability, and redundancy in data networks. In the case of routers, incoming data are inspected and a routing (configuration) table is consulted before forwarding the packet of data to its destination. The routing/configuration table is potentially influenced by various rules and priorities conditional on an assessment of the current network conditions. Depending on the state of the network, the router chooses the "best" route for a data packet while obeying the configured rules and priorities. Routers can effectively balance the load (bandwidth) in a network and adapt quickly to failed links. The specified rules and priorities endow the router with context to handle different packets of data appropriately. It is assumed that the headers associated with each data packet contain sufficient information for the router to consult the routing table and take the appropriate action. All routers can be monitored and managed using SNMP. Switches are simpler than routers and possess no internal intelligence that actively modifies their packet forwarding behavior. Rather, they rely on packet agnostic scheduling and treat all incoming data as being equal and subject to the same switching priorities.

Content-aware switches and routers add three important new elements to traditional switches and routers: (1) analytics driven packet valuation and prioritization; analytics driven transcoding of raw sensor data; and (3) long-term internal data storage capabilities. These three elements considerably influence the standard operation of existing components in routers and switches. Features of content-aware devices are explained in the following four subsections: (I) Hardware, (II) Protocols, (Ill) Network setup and initialization, and (IV) Normal device execution and operation.

I. Hardware: In some embodiments, there are three hardware components for content-aware switches and routers: (1) high speed packet separation; (2) scalable local processing for the value assessment and prioritization; and (3) scalable local long-term storage for sensor data. Optionally, the IP line interface card (LIC) could instead be replaced with a card whose output interface is identical to that of the LIC, but whose input is analog video common to many surveillance systems. This special LIC might also support serial command and control interfaces for traditional cameras. In most cases, switches might support both IP input and analog video input.

As packets arrive at the device, they are quickly classified and separated into data packets and sensor packets. Non-sensor data is placed in the normal routing/switching queue, while sensor data is first sent to the analytics engine for any valuation and prioritization. The packet classification and separation mechanism is necessarily a simple process so that it can be executed at line speed rates. A specific sensor packet protocol will allow for the clear and easy identification of sensor packets. In addition, at the output buffer for each LIC, there is a dynamic queue control mechanism that assures appropriate bandwidth allocation between the data and sensor packets.

Beyond the existing processors resident on routers and switches (both programmable processors and ASICS), the main analytics engine runs on a separate processor with access to its own dedicated memory. Optionally, the devices can be designed in a manner such that a master processor controls a series of slave processors. Slave processors can be added on an as needed basis. The master analytics processor distributes tasks among the slave processors. A "scalable" processor architecture allows the infrastructure devices to handle new analytics tasks for an existing sensor set and also a greater number of added sensors. Slave processors can be attached externally to the main device via any of a number of available high-speed I/O bus interfaces.

The scalable long-term storage element is much like the scalable processor element. Not all incoming sensor data necessarily should be forwarded immediately (or ever). Thus, the data can be stored locally on the device for an extended period of time (depending on the needs of the surveillance application). The device supports internal mass storage that is directly controlled by the master analytics processor. Much like the reasons for adding extra processors, there could also be reasons for extra storage. Thus, optionally, the device could allow the addition of a number of external storage units connected via a high-speed bus. Note that external processing units might support or contain storage units within a single unit.

II. Protocols: Content-Aware devices do not necessarily require a new family of low-level protocols for control, configuration and management. Most of the necessary functionality can be implemented using existing SNMP and IP protocols. Where necessary, meta-protocols (residing on any IP protocol) can be used to implement device-to-device communication methods. Protocols are necessary for the following: sensor information packet header (SIPH); content-aware device management, configuration and monitoring; and distributed directory service. While these three protocols are implemented for content-aware devices, the specific form of the protocol or its implementation is left to the discretion of the designer.

The sensor information packet header contains the following pieces of information: (1) Sensor type—This field describes the type of sensor that generated the packet. The level of detail contained in this field depends on the application. If all sensors are cameras, then this field could potentially differentiate color, black and white, IR and day/night cameras. It could also contain information about the model of the camera, the type of lens, etc. (2) Sensor ID—Every sensor has a unique identifier, in some embodiments. This identifier is used to address a particular sensor in the network. For sensors that operate in an IP environment, IP addresses are acceptable identifiers. If the sensors are not IP-based, then a suitable identifier is used in addition to the IP address of the first IP device that the sensor is connected to. (3) Location—This field contains information pertaining to the latitude/longitude coordinates of the sensor. Usually this information is specified during the installation of the sensor. If lat/long coordinates are not available, any appropriate substitute that fits within the scope of the application can be used. A text description of the location of the sensor can also be used in addition to a measurable location. (4) Timestamp—This field contains a time stamp specifying the time of creation of the data packet. (5) Analytics tasks to be performed—Based on the rules and associated alarm events specified by the user, a series of analytics tasks are performed on the sensor data. Depending on the results of a particular analytics task, additional tasks might also be performed. Such tasks are appended to the task list. (6) Analytics tasks that have been performed—This field lists the analytics tasks that have been completed so far. (7) Current value—An integer value between 1 and 100, which represents the value of the packet. Value of 100 indicates that the packet is most valuable and a value of 1 indicates that it is least valuable. (8) Current priority—The priority of a packet is determined based on its value and the time within which it has to be delivered to its destination. (9) List of device IPs where related data are stored—As sensor data travels through the network, both raw and processed information might be stored at the infrastructure devices. Where appropriate, only summarized information is forwarded to the final destination. If the alarm monitoring and management software seeks additional information, it queries the network. A record of all device IP addresses where packet related information is stored is contained in this field. (10) Delivery Time—Based on the rules and values specified by the user, the acceptable worst-case delivery time is computed for the packet and recorded in this field.

The packing of information in the SIPH can be done in many different ways. Depending on the hardware and software used to parse the header, the packing order can be optimized for speed and size.

All device management, configuration, and monitoring commands can be relayed using SNMP. Content-aware device specific commands can be added as part of a private node in a MIB tree. Any network management system (such as HP OpenView) and any SNMP capable security management system, with knowledge of the augmented MIB tree, can manage the infrastructure devices.

Sensor networks (e.g. sensor network 904', FIG. 10) consists of a variety of sensors, infrastructure devices with various analytical capabilities, storage devices and management, monitoring and control consoles. As opposed to traditional data packets that have a clearly marked destination IP, the destination of sensor data packets is determined by the infrastructure devices after the packet contents have been analyzed. The analysis process might request the packets to be routed through a series of infrastructure devices endowed with the appropriate analytics capabilities. Thus, knowledge of the services offered by various devices in the network is made available to all devices and sensors in the network, according to some embodiments. Since each device's capabilities do not change dramatically over time, a simple service directory is maintained locally. Every device broadcasts the information about its capabilities and that of the sensors connected directly to it. The broadcast is trapped by other devices in the network and the local directories are updated. The broadcasted packets can be sent using standard TCP/IP with an application specific header that identifies it as being a directory-update packet. Storage devices and consoles also participate in the directory update process. Whenever a device's service status changes, a directory update packet is broadcasted. New devices added to the network broadcast their presence and request the current directory from one of their neighboring nodes.

III. Network Setup and Initialization: When content-aware infrastructure devices are brought online, the following sequence of initialization procedures is executed. (1) Device Discovery—Routers and switches determine the device types that are directly connected to them. (2) Service Discovery—Routers and switches determine the services offered by other infrastructure devices, storage devices and user workstations. (3) Rules and actions propagation and activation—All user defined rules and actions are parsed and distributed to the sensors and infrastructure devices. Based on the rules specified by the user, analytics tasks to be performed on a given sensor's data are determined. Based on the task list, best route(s) for a sensor's data packet is (are) computed.

In Device Discovery, any given switch can be connected to computers, sensors, other switches and storage devices. When a device is initialized or as the connection state of a switch changes, it updates its local directory. For each connection, the device queries and catalogs the type and the capabilities of the connected node. Certain connected nodes that have nothing to do with the sensor network's application, might not respond to any query from the content-aware device. If a connected node does not respond, it is marked as a data network node and any future interaction is no different than the interaction between a computer and a traditional content agnostic infrastructure device. Certain content-aware devices might allow for analog sensors to be connected to them. In such cases, the switch or the router acts as an IP proxy for these sensors and assigns them a unique identifier.

Content-aware routers behave much like switches when it comes to device discovery. Routers, unlike switches, might not accommodate analog inputs and for the most part might be connected to other infrastructure devices. Routers query each attached device for their type and capabilities. If a router is connected to another content-aware switch or router, it also updates its local directory with the number of sensors accessible through the connected nodes. Specifically, if any of the connected switches are acting as a proxy for an analog sensor, the router updates its local directory with a route to the sensor and its unique ID.

In the case of wireless routers and switches, the devices consider the possibility that a single sensor could be accessible via multiple access point switches. In such cases, the infrastructure devices go through an arbitration phase wherein they nominate a primary, secondary and (if available) a tertiary access point for any sensor. The arbitration process is a function of the capabilities of the access points, the nature of the sensor and the link strength.

At the end of the device discovery process, every node in the data-sensor network is accounted for by at least one infrastructure device. The capabilities of a sensor or data node are also catalogued by at least one infrastructure device. Note that certain analytics services can be offered exclusively by data nodes (i.e., servers or workstations). Also, every content-aware router is aware of every sensor in its sub-network.

In Service Discovery, once the device discovery process in complete and each infrastructure device is aware of the sensor and data nodes connected to it, the service discovery process commences. Every infrastructure node propagates its local service directory (which includes the services offered by the sensor and data nodes connected to it) to the router controlling the subnet. Once the router has a complete directory of services for its subnet, it shares this information with other content-aware routers. Types of services include various analytics, storage, monitoring, configuration and management services.

Multiple instances of the same service might be offered by multiple nodes and infrastructure devices in the network. Every node and device that advertises a service also includes information about its throughput and any other limitation of the service or the service provider. For example, a switch might have certain sensors that operate only during the night. Thus, the resource availability during the day for that switch is higher than at night. Such properties of a given service are also recorded and shared in the service directory.

In Rules and Actions Propagation and Activation, the purpose of any sensor network is to assist in monitoring the environment to detect activities of interest and take appropriate action. Traditionally, sensors such as cameras have been used to record and/or display the information for human review. Humans, in turn, analyzed the information and acted on it appropriately. With the use of analytics, many of the monitoring tasks can be automated. But, humans still have to define the type of events they wish to detect and the corresponding action(s). The definition of events takes the form of rules. Rules and actions expressed in natural language look like the following: (Rule) When a human is detected in Sensor A; (Action) Notify Operator B with the sensor's information.

In order for the above rule and action to be enforced, the analytics services have to allow for the detection of humans. Once the rule has been violated, i.e., an event is detected, the action specifies how the event is communicated to the user. Third party management and configuration interfaces can allow users to specify the rule-action pair in many possible ways. Besides the action associated with each rule violation, users can also specify the notification value of each rule and the permissible time within which the actions have to be executed. The specified value and delivery time assist in scheduling and arbitrating the order of execution of actions associated with violated rules.

Once the rule-action pair, value, and delivery time are specified, the system executes the following three steps: (1) Determine the sensor dependency—Determining sensor dependency involves enumerating the sensors that the rule depends on. A rule might depend on a single sensor or a collection of sensors. (2) Determine the service dependency—Determining service dependency involves enumerating all the services used to enforce a rule and the corresponding action. (3) Launch and configure the services—Once the sensors and services are enumerated, a set of routes are computed from the sensor to the destination specified or implied by the selected action. A set of routes that provide the necessary services within the specified delivery time constraints are selected. The optimality of the routes is evaluated based on the capacity of the node or device to execute the service in a timely manner and the proximity of the device or node to the sensor(s). Once the optimal routes are computed, each infrastructure node in the route is informed and the services are launched and initialized.

As an example consider the following rule-action pair: (Rule) When a red sedan with license plate number ABC 123 is detected in Sensor A, Sensor D, Sensor E and Sensor L; (Action) Notify parking lot Operator A with the event information, notify command center Operator C with a video clip and event information and store the event video with maximum quality.

Step 1: Determine the sensor dependency (Sensors A, D, E, and L). Step 2: Determine service dependency (Vehicle detection, Vehicle type and color classification, License Plate recognition, High-quality video compression service, Storage service). Step 3: Launch and configure services at destinations for the information including Parking Lot Operator A, Command Center Operator C, Storage unit to be chosen by the system, or other locations.

The system determines the infrastructure devices where information from sensors A, D, E and L are aggregated. The devices could be switches or routers. Along every route from the sensors to the device, the capacity of the devices and nodes to support the selected services is evaluated. The various routes to the various infrastructure devices are ranked based upon the optimality of the routes as a function of latency and capacity to provide the selected services. Once the best route is determined, all nodes in the route are notified of the path the sensor packet will take along the network. It is possible that multiple routes might be deemed acceptable and in the interest of redundancy and fault-tolerance, the alternative routes might also be sent to the infrastructure devices. Once the aggregation device is determined, it is notified of the destinations of the event information. Note that the high quality video clip might be stored right at the sensor or well before the information arrives at the aggregation device. If the aggregation device determines that the rule was not violated, it might notify the storage device that the stored video is of no value.

IV. Normal Network Execution and Operation: Once the system has been setup and is ready for operation, for every packet that arrives at a switch or a router, the following operations are performed: (1) Separate sensor packets from data packets: Based on information in the SIPH and the sender of the packet, sensor packets are separated from data packets. SNMP control and management packets are appropriately forwarded to the master analytics processor by the router or switch processor. (2) Determine if the sensor packet will be locally processed or forwarded: A local route cache (if one is available) is consulted to figure out which interface the packet should be forwarded to. Otherwise, based on the task list in the SIPH and the services offered by the device, the packet is either appropriately forwarded or sent to the analytics engine. (3) The analytics processor buffers the necessary packets and performs the processing: A single packet might not be sufficient for processing. Thus, packets from a sensor are buffered until sufficient context is available. Also, if multiple sensors are being processed, the tasks are scheduled in a FIFO buffer. (4) Determine the destination and reformat data if appropriate: Based on the processing results, the task list in the SIPH is amended and the services directory is consulted to determine the next destination. In certain cases there might be multiple destinations for the processed information (for e.g., storage on another device). Depending on the value of the data, chunks might be replicated across multiple storage units. In some cases, the data might have to be reformatted once the destination is determined. For example, video might have to be transcoded or scalability options might have to be chosen for transmission to a mobile device. (5) Once the processing is complete, assign the packet a value and a destination: Based on the user-supplied rules, associated value and delivery time constraints, the packet (or set of packets) is assigned a priority. Packets are placed in the appropriate interface's FIFO buffer according to the assigned priorities. Some data might also be stored locally without further propagation of the data through the network. (6) Value back-propagation: Since data could be stored in various infrastructure devices before the value of the packet is determined, the value has to be back-propagated to these devices. The value is used to determine if the information should be discarded, saved or replicated. (7) Transmit Packet(s): The processed packet is placed in regular send queue and the packet switch schedules delivery based on the specified bandwidth allocation and packet priority.

If the packet received is an SNMP message, the MIB is translated and if the packet is meant for the analytics services, the message is appropriately forwarded. The master analytics processor also assumes the responsibility of managing and configuring all analytics, compression and storage related services.

Using content-aware switches and routers as infrastructure devices in a hybrid sensor-data network provides a greater QoS than traditional devices. Content-aware devices maximize information delivery speeds by: (1) Minimizing transmitted information: Network congestion is the most common cause of delayed delivery and resend requests. Content-aware devices minimize network congestion by locally storing or discarding low importance or unimportant packets. (2) Prioritizing packets: Not all packets are equally important. Content-aware devices prioritize packet propagation and assure the delivery of important packets in a timely manner. (3) Allocating bandwidth optimally: Content-aware devices allocate bandwidth for data and sensor traffic optimally and guarantee that neither the sensor network nor the data network overwhelm each other.

Content-aware devices also support greater network scalability by: (1) Supporting additional sensors: New sensors can be added at any time and the devices appropriately adjust their service deployment metrics to accommodate them. When a given switch or router reaches its capacity, additional processors and/or storage can be added easily. (2) Supporting new services: New services that operate on the sensor data can also to be deployed seamlessly. Moreover the infrastructure devices compute the optimal deployment strategy based on the nature of the service and the state of the network. (3) Supporting changing rules and policies: As users amend the rules and policies specifying the events of interest, the network seamlessly adapts. Service deployment and processing models are automatically computed without any additional user intervention.

Content-aware devices add redundancy and fault tolerance to the sensor network by: (1) Distributed storage: Based on event values specified by way of rules and policies, the sensor network can replicate important information across multiple distributed storage units in the network. Thus, even if a storage node fails, important information can be recovered from other nodes in the network. (2) Optimal transmission of information through multiple routes: If certain nodes providing certain services fail, the network can automatically reroute data to alternative service providers. Wireless networks with redundant access points (such as mesh topologies) can very effectively take advantage of the capabilities offered by content-aware devices.

Techniques described in this section are broadly applicable and establish a potential basis for a standard for all surveillance sensor network applications. While a video analytics component provides content-awareness capabilities in some embodiments, the techniques described below do not depend on any specific sensor analytics algorithm or system. Furthermore, embodiments described in this section include network switches and routers, but content-aware computer networking devices may include other devices possessing an internal routing table and an IP stack. For example, IP Cameras, 802.xx-based sensors, Bluetooth based sensors, Digital Video Recorders, Performs packet switching and forwarding tasks, Network switches and hubs, Performs wide- and local-area packet routing, Routers, and Bridges could each include content-aware storage with video analytics.

Data Storage System

Figure 7:
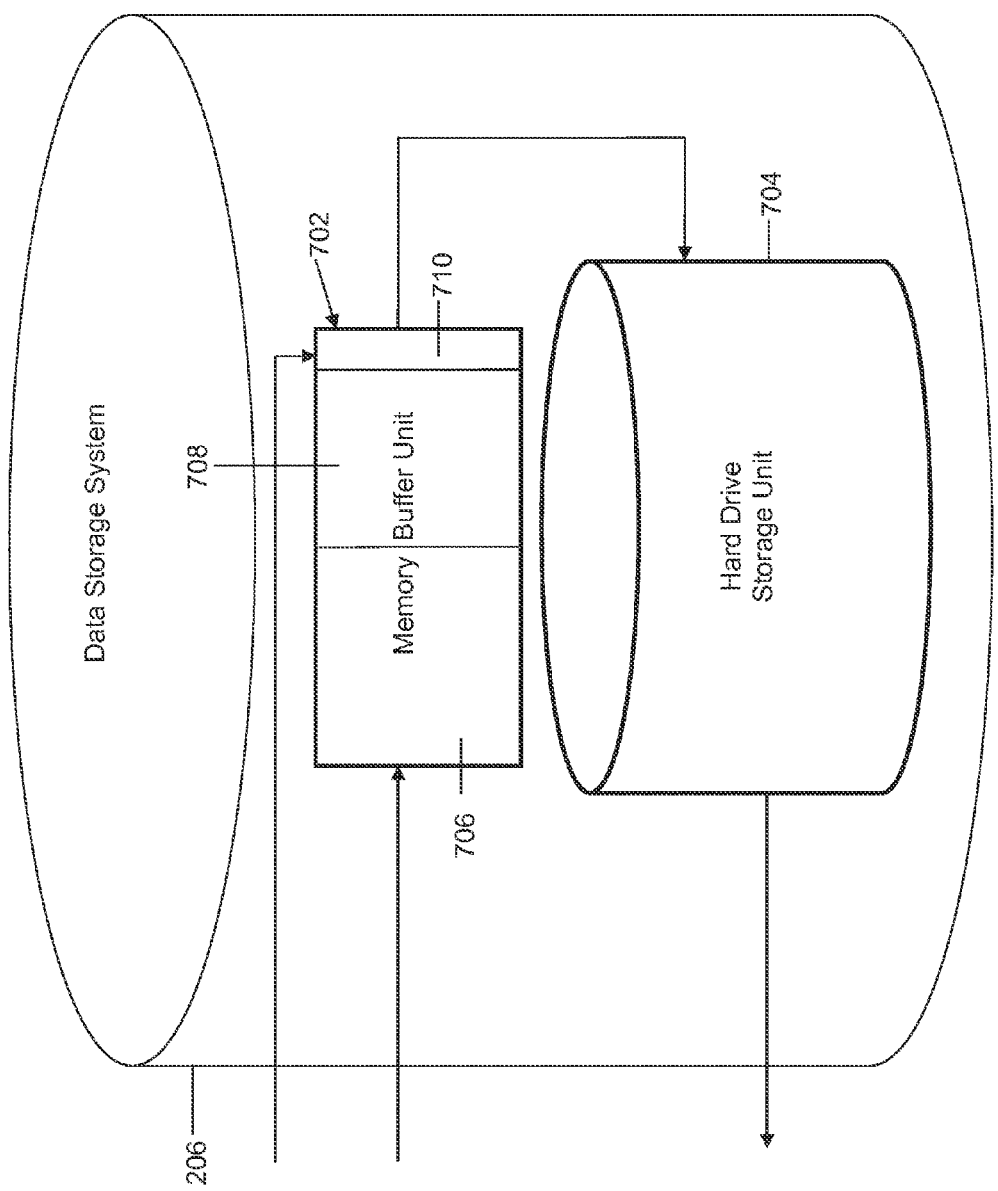
FIG. 7 is a block diagram representing a memory buffer unit and a hard drive storage unit of data storage system.

Data storage system 206 is described in detail with reference to FIG. 7. Data storage system 206 may be included in network camera 102, or data storage system 206 may be external to network camera 102 and may communicate with network camera 102 over network 106. Data storage system 206 serves as a mass storage unit that includes at least one GB, preferably 80 GB or more, of storage capacity. Data storage system 206 includes a solid state memory buffer unit 702 and a hard drive storage unit 704.

Memory buffer unit 702 may include non-volatile and volatile memory, such as NANO flash memory and RAM. If volatile memory is used as memory buffer unit 702, a secondary power supply may be included in network camera 102 in case of power failure. In a preferred embodiment, one GB of NANO flash memory is used, but memory buffer unit 702 may include a memory size larger or smaller than one GB. Sectors of memory buffer unit 702 may be allocated for different types of data, as indicated by portions 706, 708, and 710. For example, portion 706 represents 50% of memory allocated to store the most recent video data captured by imaging system 202. Portion 708 represents 40% of memory allocated to store the most recent events or objects of interest captured by imaging system 202. Portion 710 represents 10% of memory allocated to store metadata generated by video analytics 304. Allocation of memory is not limited to the above example and can be adapted to meet the needs of a particular application. Also, portions 706, 708, and 710 may be periodically rotated to correspond to different sectors of memory buffer unit 702 to prolong the operating lifespan of the sectors of memory buffer unit 702.

Hard drive storage unit 704 may be any type of mass storage device including a hard-disk drive and a large capacity solid state memory device. For simplicity, hard drive storage unit 704 is described herein as a hard-disk drive, but many of the features described are also applicable to a large capacity solid state memory device. The storage capacity of hard drive storage unit 704 may be any size, but, preferably, the storage capacity would be 80 GB or more. Hard drive storage unit 704 includes a read/write head and a storage memory disk.

In operation, during a first time interval, memory buffer unit 702 receives video data from imaging system 202 or video processing system 204' and stores the video data in portions 706 or 708, as directed by storage management system 306, according to the content of the video data. Memory buffer unit 702 also receives metadata generated by video analytics 304 and stores the metadata in portion 710. Because the metadata is synchronized to the video data, the video data can be quickly searched according to content by referring to the metadata. For the majority of time that video data and metadata are being stored in memory buffer unit 702, hard drive storage unit 704 is in a powered-down state. A powered-down state includes multiple states such as a total power-off state or one of several idle, standby, or sleep states described in connection with Hitachi's Enhanced Adaptive Battery Life Extender (ABLE)™ technology. For example, in a powered-down state, the read/write head may be in a "loaded" or activated condition without executing read/write commands while the storage memory disk is spinning, the read/write head may be in a "loaded" or activated condition while the storage memory disk is not spinning, the read/write head may be in an "unloaded" or non-activated condition while the storage memory disk is spinning, or the read/write head may be in an "unloaded" or non-activated condition while the storage memory disk is not spinning. Generally, a powered-down state is characterized by a power level less than a power level of a powered-up state. A total memory buffer storage time represents a sum of the first time intervals.

During a second time interval determined by storage management system 306, hard drive storage unit 704 is powered-up (i.e., the read/write head is in an activated condition to execute read/write commands and the storage memory disk is spinning) and video data from one or more portions 706 and 708 are communicated from memory buffer unit 702 to hard drive storage unit 704 to be stored in hard drive storage unit 704. Metadata from portion 710 may also be communicated to hard drive storage unit 704 during the second time interval. Storage management system 306 determines the amount of data that are to be supplied from memory buffer unit 702 and written to hard drive storage unit 704. During the second time interval, memory buffer unit 702 may continue to receive and store video data and metadata to prevent interruption in the storing of video data and metadata. At the end of the second time interval (e.g., after a predetermined amount of data of memory buffer unit 702 are written to hard drive storage unit 704) memory buffer unit 702 stops supplying data to hard drive storage unit 704 and hard drive storage unit 704 is powered-down. A total hard drive storage time represents a sum of the second time intervals. The total hard drive storage time spent transferring to and storing a portion of the video data in hard drive storage unit 704 is substantially less that the total memory buffer storage time spent storing the video data in memory buffer unit 702.

Storage management system 306 may control a write operation from memory buffer unit 702 to hard drive storage unit 704 at any time such as when a predetermined condition is satisfied. For example, a predetermined condition might be to perform the write operation when one of portions 706, 708, or 710 is near capacity. Or, in mobile applications such as a camera in a vehicle, a write operation may be performed when a motion sensor, accelerometer, or other sensor located within the vehicle indicates that the vehicle is stationary so that damage to the hard drive storage unit 704 may be avoided or to eliminate the need to include a hard drive with extensive shock absorption. The motion sensor, accelerometer, or other sensor may be contained within the camera housing. A sensor includes a vehicle on/off switch. For example, when a vehicle is turned off, the vehicle battery may keep data storage system 206 powered-up so that video data may be transferred from memory buffer unit 702 to hard drive storage unit 704 during the off state of the vehicle-ideally, the vehicle is stationary during an off state. The write operation may be stopped when all the data from one or more portions 706, 708, and 710 have been written to hard drive storage unit 704 or when another condition is met, such as vehicle movement. Additionally, storage management system 306 may control hard drive storage unit 704 to be powered-up when a user requests retrieval of video data stored in hard drive storage unit 704. Hard drive storage unit 704 would be powered-up to supply video data to video processing system 204 (204') so that the video data may be supplied to a user over network 106.

In mobile applications, a single data storage system 206 may serve multiple imaging systems 202 of a vehicle (e.g., multiple cameras on a bus), or one hard drive storage unit 704 may serve multiple imaging systems 202 that include their own memory buffer units 702. When the vehicle comes to a stop, hard drive storage unit 704 is powered-up and data is transferred from memory buffer unit(s) 702 quickly by optimizing the communication speed between memory buffer unit(s) 702 and the hard drive storage unit 704 and by implementing a hard drive storage unit 704 with a fast write speed (e.g., approximately 665 Mbits/sec or more). Also, when a vehicle includes multiple imaging systems 202, data transfer can be accomplished quickly by lowering the frame rate of each imaging system 202 without substantially sacrificing video quality. For example, if a vehicle included eight cameras operating at 7.5 fps, the video data generated by the eight cameras would be equivalent to data generated by two cameras operating at 30 fps.

By storing video data in memory buffer unit 702 and by powering-up hard drive storage unit 704 periodically, the operating life of the hard drive storage unit 704 may be extended because hard drive storage unit 704 is not constantly powered-up. For example, if 01 resolution video data are recorded at 30 fps and compressed using MPEG-4 compression, portion 706, with 500 MB of storage capacity, could record approximately one hour of 01 resolution video data. Depending on the data transfer rate of memory buffer unit 702 and hard drive storage unit 704, 500 MB of data may be transferred from memory buffer unit 702 to hard drive storage unit 704 in four minutes or less. Thus, out of one hour, hard drive storage unit 704 may need to be powered-up for only four minutes. This represents a 1/15 ratio. The powered-up ratio of hard drive storage unit 704 is not limited to 1/15, but may be greater or less and may vary over time depending on the content of the video data. For example, a user may choose to store lower than full frame rate video in which hard drive storage unit 704 could be powered-up less frequently than once per hour. Preferably, the average powered-up duration will be substantially less than the average powered-down duration. By comparison, a typical hard drive that is powered-up continuously may have a lifespan of approximately five years. By powering-up hard drive storage unit 704 for four minutes out of one hour, for example, the lifespan of hard drive storage unit 704 may be increased by more than ten times the lifespan of a typical, continuously operated hard drive. Thus, by decreasing the power-up hours of hard drive storage unit 704, the lifespan of hard drive storage unit 704 is extended.

Because hard drive storage unit 704 is powered-up and down repeatedly, a preferred embodiment of hard drive storage unit 704 includes a wear durable hard drive in which the number of on/off cycles does not substantially reduce the lifespan of hard drive storage unit 704. A wear durable hard drive includes a read/write head that is physically parked off a storage memory disk (i.e., "unloaded") during one or more of the powered-down states such that the read/write head does not contact the storage memory disk during a powered-up state or a powered-down state. For example, hard drive storage unit 704 may implement Hitachi's ramp load/unload technology described in connection with its Travelstar® hard drive.

In a conventional contact start-stop (CSS) hard drive, the read/write head rests directly on the storage memory disk during an off state. When the CSS hard drive is powered-up, the read/write head and the storage memory disk remain in contact until air generated by the spinning storage memory disk causes the read/write head to lift off of the storage memory disk. Because the read/write head and the storage memory disk are in contact while the storage memory disk is spinning, the read/write head and the storage memory disk of a CSS hard drive are subject to wear. For example, a CSS hard drive may be able to withstand only 50,000 on/off cycles before failure. If a CSS hard drive was cycled on and off once per hour, the CSS hard drive would last only five or six years.

In contrast, a wear durable hard drive can withstand, for example, 300,000 on/off cycles or more-preferably 600,000 on/off cycles or more. In other words, if the preferred wear durable hard drive is cycled on and off once per hour, the hard drive would last about 60 years or more. Thus, by implementing the wear durable hard drive of the preferred embodiment, the number of on/off cycles will not substantially reduce the lifespan of hard drive storage unit 704. Because the lifespan of data storage system 206 is relatively long, data storage system 206 requires little maintenance or upgrade. Thus, a network edge device, such as network camera 102, can practically include data storage system 206. In contrast, without implementing the life extension features described above, a network camera system that provided a large number of mass storage units in network edge devices would require large repair and maintenance costs. This is so because the mass storage units would fail frequently and be distributed in places difficult to serve (such as on tops of tall poles). With the life extension features described above, mass storage units can be provided in network edge devices without the need of frequent replacement.

It will be understood by skilled persons that many changes may be made to the details of the above-described embodiments without departing from the underlying principles of the invention. The scope of the present invention should, therefore, be determined only by the following claims.

What is claimed:

1. A method of reducing video communication bandwidth requirements within a video surveillance camera network, the method comprising:
    associating one or more video cameras with one or more network devices positioned within the network, the network including one or more network communication paths between the one or more video cameras and one or more client devices, the one or more video cameras being configured to produce packets of video stream information based on scenes observed by the one or more video cameras, the one or more network devices including video analytics and being further configured to analyze video content within the video stream information using the video analytics;
    receiving at the one or more network devices the packets of video stream information and routing configuration information;
    analyzing and routing the packets of video stream information from the one or more video cameras to the one or more client devices via at least one of one or more network communication paths based on the routing configuration information, the routing configuration information defining an event of interest in a scene and configuring the one or more network devices to prepare managed video in response to the video analytics detecting the event of interest in the video content, wherein managed video including the event of interest in the scene is prepared at a first quality level and managed video not including the event of interest in the scene is prepared as a second quality level;
    storing the managed video in a local mass storage device that is contained in or connected to a housing of the one or more network devices; and
    distributing the managed video through at least one of the one or more network communication paths such that distribution of the managed video consumes substantially less network bandwidth than would be consumed by distribution through the at least one of the one or more network communication paths in the absence of analysis by the video analytics.

2. The method of claim 1, wherein the managed video excludes portions of the video content based on whether the portions include the video content corresponding to events of interest.

3. The method of claim 1, wherein based on object characteristics and actions recognized from the video content, configuring the one or more network devices to prepare managed video includes determining whether portions of the video content are to be discarded, contemporaneously forwarded and discarded, contemporaneously forwarded and stored in the local mass storage device, or stored in the local mass storage device and made available for subsequent distribution.

4. The method of claim 1, wherein the one or more client devices further include one or more of a console workstation, a remote mass storage device, a server, a video recorder, and a mobile communications user equipment device.

5. The method of claim 1, wherein the one or more network devices operate at an Open System Interconnection (OSI) Model Layer 3 or OSI Model Layer 2.

6. The method of claim 1, wherein the event of interest comprises a predetermined period during which the video content is regularly sampled and archived.

7. The method of claim 1, wherein the event of interest comprises an object of interest or an object action of interest.

8. The method of claim 1, wherein the first quality level and the second quality level of the managed video is prepared by transcoding the video stream from a first bit rate to a second bit rate different from the first bit rate.

9. The method of claim 1, wherein the associating comprises generating a routing table of nodes configured to communicate through the one or more network communication paths.

10. The method of claim 9, wherein the routing table includes, for each of the one or more network devices, a description of fault tolerance and load balancing resources available among the one or more network devices.

11. The method of claim 10, wherein the fault tolerance and load balancing resources available among the one or more network devices include video processing, video analytics, or redundant mass storage resources.

12. The method of claim 1, wherein the event of interest is characterized by a sequence of objects or actions of interest, and wherein the video content comprises pre-analyzed video content previously analyzed by the one or more network devices to identify at least one object or action of interest in the sequence of objects or actions of interest.

13. The method of claim 1, wherein the managed video represents fields of view of the scenes observed, and the event of interest includes motion detected within one or more of the fields of view.

14. The method of claim 1, wherein the managed video represents fields of view of the scenes observed, and the event of interest includes a predefined object appearing within one or more of the fields of view.

15. The method of claim 14, wherein the video analytics uses geometric calibration to recognize the predefined object as the predefined object moves to various portions within the one or more of the fields of view.

16. The method of claim 1, wherein a portion of the managed video is supplied to a remote mass storage device at a selected time characterized by low network activity of the network.

17. The method of claim 1, wherein the managed video stored in the local mass storage device includes video content that represents and does not represent the event of interest.

18. The method of claim 1, wherein the one or more network devices includes a set of video storage rules including different video retention policies for managed video representing and not representing the event of interest.

19. The method of claim 1, further comprising storing in the local mass storage device the managed video encoded at a first quality level in response to the event of interest not being detected, and storing in the local mass storage device the managed video encoded at a second quality level in response to the event of interest not being detected, the first and second quality levels being different from each other.

20. The method of claim 1, wherein the routing configuration information includes a ranking of importance levels of multiple events of interest, the importance levels defining distribution or storage priorities for the managed video.

21. The method of claim 1, wherein the distributing includes distributing the managed video to a recipient device, in which the recipient device is a sensor, a router, a switch, a server, or a user equipment device including a user interface configured to display the managed video.

22. The method of claim 1, wherein the routing configuration information is received from a task compiler, the routing configuration information including a routing table generated by the task compiler based on user input selections of events of interest, the routing table defining, based on the events of interest, recipients of the video stream information and of the managed video.

* * * * *